United States Patent [19]

Hester et al.

[11] Patent Number: 5,407,580

[45] Date of Patent: Apr. 18, 1995

[54] PROCESS FOR SEPARATING ACID-SUGAR MIXTURES USING ION EXCLUSION CHROMATOGRAPHY

[75] Inventors: Roger D. Hester, Hattiesburg, Miss.; George E. Farina, Killen, Ala.; Srikanth Nanguneri, Baton Rouge, La.

[73] Assignee: Tennessee Valley Authority, Muscle Shoals, Ala.

[21] Appl. No.: 128,174

[22] Filed: Sep. 29, 1993

[51] Int. Cl.$^6$ .............................................. B01D 15/08
[52] U.S. Cl. .................................. 210/635; 210/656; 127/46.3
[58] Field of Search ............ 210/635, 656, 659, 198.2; 127/46.2, 46.3, 30, 55

[56] References Cited

U.S. PATENT DOCUMENTS

| | | | |
|---|---|---|---|
| 3,487,938 | 1/1970 | Patterson | 210/198.2 |
| 4,361,482 | 11/1982 | Teetz | 210/198.2 |
| 4,597,866 | 7/1986 | Couillard | 210/198.2 |
| 4,769,141 | 9/1988 | Couillard | 210/198.2 |
| 4,891,133 | 1/1990 | Colvin | 210/198.2 |

OTHER PUBLICATIONS

Chen, Ind. Eng. Chen. Process Des. Devel., 1972, vol. 11 p. 430.
Culp, Hand book of Advanced Waste Water Treatment, 2nd ed, Van Nosteand-Reinhold, New York, 1978, pp. 249–297.
Parkhurst, J. Water Pollut. Control Fed., 1967, vol. 39, pp. 70–81.
Nanguneri, "Design, Development and Analysis at a Preparative Scale Ion Exclusion Chromatography System", Ph. D. Dissertation, The University of Southern Mississippi, pp. 1–165.
Tanaka, J. Liquid Chrom, 1986, vol. 361, pp. 151–160.
Tanaka, Anal. Chem., 1987, vol. 59, No. 5, pp. 708–712.
Kihara, J. Chrom., 1987, vol. 410, pp. 103–110.
Neuman, Reactive Polymers, 1987, vol. 5, pp. 55–61.
Nanguneri, Separation Science & Technology, 1990, vol. 25, pp. 1829–1842.
Harlow, Anal. Chem., 1964, vol. 36, No. 13, pp. 2438–2442.
Tikunga, J. Liquid Chrom., 1983, vol. 6, No. 2, pp. 271–280.
Tanaka, J. Liquid Chromatography, 1979, vol. 174, pp. 153–157.
Helfferich, Ion Exchange, Mc Graw-Hill, Book Company, 1962, pp. 134–135.
Nanguneri, "Acid/Sugar Separation Using Polymeric Ion Exchange Resins: A Process Analysis and Design, Master's Thesis", University of Southern Mississippi, 1989, pp. 1–82.
Wheaton, Annals New York Academy of Sciences, 1953, vol. 53, pp. 159–176.
Simpson, Chemical Engineering Process, 1954, vol. 50, No. 1, pp. 45–49.

Primary Examiner—Ernest G. Therkorn
Attorney, Agent, or Firm—Robert A. Petrusek

[57] ABSTRACT

A process for effectively and economically separating an ionic component such as acid from a nonionic component such as sugar in polar solutions using ion exclusion technology whereby the viability of using hydrolysis to convert wood and agricultural waste products such as corn stover into fuel alcohol is substantially effective. Underlying the gist of this invention are newly discovered methods by which dispersion, caused by shrinkage of resin within ion exclusion columns, is controlled resulting in operation of such columns, over a wide range of process conditions to produce separate and distinct elution profiles for the acid and sugar. Successful operation of these new ion exclusion methods, techniques, and systems can replace lime precipitation which currently is being used in acid hydrolysis processing. This not only obviates the need for the large quantities of acid and lime required therein, but also eliminates the unwanted and highly ecologically undesirable production of huge quantities of waste gypsum.

9 Claims, 10 Drawing Sheets

PROCESS FOR SEPARATING ACID-SUGAR MIXTURES USING ION EXCLUSION CHROMATOGRAPHY

The invention described herein may be manufactured and used by or for the Government for governmental purposes without the payment to us of any royalty therefor.

INTRODUCTION

The present invention relates to substantial improvements in the area of utilizing ion exclusion resins to separate an acid/sugar mixture or hydrolyzate into its components. For the purpose of the instant invention, hydrolyzates, or acid and sugar mixtures produced by the hydrolysis of a cellulosic material in the presence of an acid catalyst, and acid/sugar mixtures or synthetic mixtures produced by simple mixing in the laboratory, are referred to interchangeably. More particularly, the present invention comprises a discovery by which the previously observed problem, normally associated with ion exclusion and generally referred to as dispersion attributed to shrinkage of the resin, is substantially eliminated by employing any of a number of different, distinct, but substantially effective, techniques which resultingly render ion exclusion a viable processing technique for separating acid/sugar mixtures or hydrolyzates on a commercial scale. As used herein resin in the "shrunken state" means and refers to a state in which the crosslinked polystyrene, comprising the structure of the resin and having a $SO_3^-H^+$ functionality, contracts in the presence of similarly charged ions in the process fluid due to the force of repulsion. As used herein resin in the swollen state means and refers to a state in which the crosslinked polystyrene, comprising the structure of the resin and having a $SO_3^-H^+$ functionality, expands to its fully relaxed state in the presence of a nonionic media which thoroughly penetrates the micropore structure of the resin. Dispersion, as it relates to the subject invention, is defined as a broadening and flattening of the chromatogram elution profiles. The term "band broadening" is also used in chromatography to define this phenomenon, but this term will not be used herein. Dispersion, as will be shown, results from a variety of operating conditions. The introduction of an acidic solution into a resin column results in shrinkage of the ion exclusion resin bed wherein and thereby effects a continuous change in concentration of the acid/sugar mixture above the resin bed and is a major factor effecting dispersion. The resulting dilution of the mixture, in turn, results in an undesirable overlapping of the acid elution and sugar elution streams from such resin bed. By eliminating or properly compensating for shrinkage, the resin, which acts as a sorbent in the process, effectively accelerates the elution of acid while at the same time retards the progress of the sugar through the column thereby permitting complete, reproducible, and predictable separation of the acid/sugar mixture. The separation is effected by the difference in the relative sorption strengths. Strong electrolytes, such as sulfuric acid, are mostly or completely excluded from ion exclusion type resins by the Donnan effect (F. Helfferich, *Ion Exchange*, McGraw-Hill Book Company, New York, 1962), and appear first in the discharge from the column. Nonelectrolytes, such as sugar molecules in aqueous solutions, are readily sorbed by such resins and, therefore, appear later in the discharge from the column. It has now been found that practice of the instant invention allows for continuous and protracted use of ion exclusion resin columns in large-scale or commercial-scale operations whereas heretofore, the only effective technique available to prior art practitioners for avoiding the deleterious effects of resin shrinkage was to use only relatively small charges of acid/sugar mixtures to the column, to thereby assure that elution of the separated constituents was effected before significant resin shrinkage occurred along with the resulting effects thereof. Accordingly, in such prior art practice, this technique was necessarily limited to small batch operations.

BACKGROUND OF THE INVENTION

1. Field of the Invention

Work conducted at the facilities of the Tennessee Valley Authority, using a low-temperature concentrated acid hydrolysis scheme for the conversion of the cellulosic fraction of corn stover to monomeric sugars and subsequently to ethanol, demonstrated the high cellulosic conversion efficiencies and potential ethanol yields possible with the so-called concentrated acid hydrolysis process. Nevertheless, the concentrated acid hydrolysis process, although technically viable, was considered to be uneconomical because, prior to utilizing the hydrolyzate produced in that process, the acid present in the hydrolyzate had to be removed or separated therefrom. The most effective means for removal of the acid, which was commonly known at that time, was lime precipitation; however, the cost associated with attendant sulfuric acid and calcium oxide consumption was found to be economically unattractive. Also, the additional cost of disposal of the neutralization product, i.e. gypsum, also militated against commercialization of the concentrated acid hydrolysis process (S. R. Nanguneri, "Acid/Sugar Separation Using Polymeric Ion Exchange Resins: A Process Analysis and Design," master's thesis, University of Southern Mississippi, 1989).

Subsequently, work utilizing an agricultural cellulosic residue in a concentrated acid hydrolysis process resulted in the realization that an integrated cellulose conversion process employing a chromatography system for acid recovery and recycle could provide a viable process.

As is well known, electrolytes can be separated from nonelectrolytes in solution therewith using any of a number of chromatographic techniques including: ion exchange, ion exclusion, and ion retardation. Ion exchange systems, in which ions are exchanged between the solute and the resin bed, have found wide application in industry due mostly to the systems ability to handle relatively high flux rates and a plethora of ionic species. However, because ion exchange does take place, regeneration of the resin is required. Ion exchange resins are typically classified as strongly or weakly acidic or strongly or weakly basic. Strongly acidic resins usually contain sulfonic acid groups, whereas weakly acid resins usually contain carboxylic acid groups. Strongly basic resins usually have quaternary ammonium groups while weakly basic resins usually contain polyamine groups.

An ion exchange resin with interchangeable $Na^+$ ions is said to be in its sodium form. Introducing an electrolyte such as an aqueous solution of $H_2SO_4$ to the system results in an exchange of the $Na^+$ with $H^+$ ions and convert the resin to its hydrogen form resulting in an elution of Na+ from the column. The subsequent elution of H+ ions from the column, commonly known as "breakthrough," indicates that the column resin has been mostly or fully spent. As may be appreciated, prior to the addition of more acid, such spent resin must be regenerated to its sodium form.

Ion exclusion systems, sometimes referred to as electrolyte exclusion systems, employ the same resins used in ion exchange systems, discussed supra, but differ in that the ionic functionality of the resin is the same as that of the electrolyte and, therefore, there is no exchange of ions. As will be appreciated, resins used in the instant invention are typically sulfonated polystyrenes with some degree of divinylbenzene (DVB) cross-linking which imparts physical stability to the resin polymer. The sulfonic acid functionality of the resin particles causes swelling in aqueous media. The resulting microporous resin particles can sorb water and nonionic solutes. The degree of molecular cross-linking with DVB influences the extent of sorption and prevents total dissolution of the porous resin. Because of ion repulsion and a high fixed acid chemical potential inside the resin microstructure, an electrolytic species, such as sulfuric acid in an acid/sugar mixture, for example, is effectively prevented from entering the porous resin. However, the nonionic sugar molecules are free to diffuse into the resin structure. Thus, electrolytes will pass through a packed resin bed faster than nonelectrolytes which are held up or delayed within the resin's microporous structure. In applying the instant invention to effect an acid separation similar to the separation used in the acid exchange system, supra, the resin used would be in its hydrogen form as opposed to the sodium form and, therefore, no ion exchange would occur in the system.

At the present time, ion exclusion technology is used for separation of ionic from nonionic or strongly ionic from weakly ionic solutes in polar media in certain analytical procedures, glycerin purification, and mixed acids separations applications (R. W. Wheaton and W. C. Bauman, *Annals New York Academy of Sciences,* 1953, Vol. 53, pp. 159–176). It differs from conventional ion exchange in that there is no net ion exchange between solute and resin. This eliminates the need for resin regeneration. Ion exclusion technology appears to have utility in separating ionic from nonionic species in aqueous solutions (D. W. Simpson and R. M. Wheaton, *Chemical Engineering Progress,* 1954, Vol. 50, No. 1, pp. 45–49). Basically, the ionic species are excluded from the fluid within the resin because of ionic repulsion within the resin particle micropore structure. This phenomena is explained by the Donnan exclusion principle, supra. Contrastingly, the nonionic species have no ionic repulsion with the resin and, therefore, penetrate the fluid within the porous resin to a greater degree. Thus, when a mixture of these two species is passed through a column of ion-exchange resin, the ionic component elutes first because it is excluded from the resin structure micropore volume. The nonionic species elutes after the ionic component because it has penetrated the resin micropore volume.

The physical and chemical characteristics of the resin are of vital importance to the design of an ion exclusion process. The total resin packed column volume can be thought of as to consist of three primary zones: 1) the macropore, also called void or interstitial volume, $V_o$, which is the liquid volume between the resin particles, 2) the micropore volume, also known as occluded volume, $V_p$, which is the liquid volume held within the resin particles, and 3) the solid resin network volume, $V_r$, which is the actual structure of the resin (S. R. Nanguneri and R. D. Hester, *Separation Sci. & Tech.,* 1990, Vol. 25, pp. 1829–1842). Due to the inherent ionic nature of the resin, an unequal distribution of ionic solute species exists between the micropore fluid (inside the resin) and macropore fluid (outside the resin) fluid phases. Thus, different resins with different pore volumes, ionic functionalities, and ionic charge density exhibit different separation characteristics with different solutes. The degree to which a solute species penetrates the micropore fluid of a resin is characterized by the distribution coefficient, $K_d$. This distribution coefficient, sometimes referred to as the partition coefficient, of the $i^{th}$ solute species is defined as follows:

$$K_{di} = C_{pi}/C_{oi}$$

where $C_{pi}$ is the concentration of the $i^{th}$ solute in the fluid located within the resin micropore volume and $C_{oi}$ is the concentration of the $i^{th}$ solute in the fluid outside the resin or in the macropore volume.

The value of $K_d$ varies with nature of the solute (ionic, nonionic), nature of resin (acidic, basic, resin cross-linkage density, particle mesh-size), solution composition, and temperature. The difference in $K_d$ values for different solutes is a good measure of the ease of species separation achievable by ion exclusion. The $K_d$ value determines the average time a species will elute from a packed resin bed. Each species flows through all the resin packed column interstitial fluid volume. However, the average fraction of resin micropore fluid volume penetrated by a species is proportional to the ratio of species concentration inside the resin to the concentration outside the resin. This ratio is the distribution coefficient, $K_{di}$. Thus, the average fluid elution volume experienced by a species, $V_{ei}$, is $$V_{ei} = V_o + K_{di}V_{pi}$$

With the fluid volumetric flow rate, Q, known through a column packed with resin and the distribution coefficient of a solute, one can predict the average time, $\theta_i$, of its appearance in the eluent. This time, prediction is accomplished through division of the species average elution volume by the fluid flow rate through the column.

$$\theta_i = V_{ei}/Q$$

Ionic species which do not penetrate or slightly penetrate into the resin micropore volume have distribution coefficients close to zero. Nonionic species which can penetrate the resin micropore volume have distribution coefficients greater than zero but less than one. If a chemical affinity exists between a species and the resin, then the distribution coefficient can exceed one.

Most of the ion exclusion chromatography used prior to the instant invention was of small scale and used only for analytical analysis as described in the following: (G. A. Harlow and D. H. Morman, *Anal. Chem.,* 1964, Vol. 36, No. 13, pp. 2438–2442); (Y. Tikunga et al., *J. Liquid Chrom.,* 1983, Vol. 6, No. 2, pp. 271–280); (K. Tanaka and T. Ishizuka, *J. Liquid Chrom.,* 1979, Vol. 174, pp. 153–157); (K. Tanaka and J. S. Fritz, *J. Liquid Chrom.,* 1986, Vol. 361, pp. 151–160); (K. Tanaka and J. S. Fritz, *Anal. Chem.,* 1987, Vol. 59, No. 5, pp. 708–712); (K.

Kihara et al. *J. Chrom.*, 1987, Vol. 410, pp. 103–110); and, (R. P. Neuman et al., *Reactive Polymers*, 1987, Vol. 5, pp. 55–61).

2. Description of the Prior Art

Ion exclusion, though widely used in analytical and pharmaceutical applications for many years, was not considered until recently for use in other than such applications due to the relatively low flux rates, small feed volumes, and weak electrolyte concentrations required to minimize dispersion and, thereby, provide for good species separation of the feedstock solution. Also, exacerbating the deleterious effects of dispersion caused by high flux rates, large feed volumes, and strong electrolyte concentrations was the dispersion caused by the presence of a so-called dead volume above the resin bed. Such dead volume resulted from shrinkage of the resin bed caused by the presence of a strong electrolyte such as sulfuric acid. Although identified as the primary factor contributing to dispersion, no successful means was devised until the discovery comprising the instant invention to deal with this phenomenon of dead volume caused by resin shrinkage.

The possibility of using strongly acidic cation exchange resins for the separation and recycle of acid from synthetic solutions of glucose and sulfuric acid has been investigated (R. P. Neuman et al., *Reactive Polymers*, 1987, Vol. 5, pp. 55–61). The work conducted at that time using Rohm and Hass Amberlite IR-118 resin in the hydrogen form and using small columns demonstrated the potential for this type of process chromatography. Note: Any reference made herein to materials and/or apparatus which are identified by means of trademarks, trade names, etc., are included solely for the convenience of the reader and are not intended as, or to be construed, an endorsement of said materials and/or apparatus. Although no actual hydrolyzates were used in the work reported by Neuman et al., the synthetic solution containing 7.7 percent $H_2SO_4$ and 1.0 percent glucose showed separation of glucose from sulfuric acid at sample loading of 10 percent of the interstitial (column void) volume and at temperatures of 55° C. and 68° C. However, as noted by the authors, this work confirmed the potential for significant dispersion when operating even small ion exclusion systems.

The techniques revealed in the instant invention readily lend themselves to batch- or semi-continuous applications such as simulated moving bed (SMB) technology. SMB systems such as the Shanks merry-go-round have been applied in adsorption and ion exchange systems for many years. The Shanks system for leaching soda ash was introduced in England in 1841. The use of SMB or merry-go-round systems is quite common in the pharmaceutical industry as described in: (J. W. Chen et al., *Ind. Eng. Chem. Process Des. Devel.*, 1972, Vol. 11, p. 430); for activated carbon adsorption in the chemical industry (H. J. Fornwalt and R. A. Hutchins, *Chem. Eng.*, 1986, Vol. 73, No. 10, p. 155) and (M. J. Humenick, Jr., "Water and Wastewater Treatment," *Calculations for Chemical and Physical Processes*, Marcel Dekker, New York, chap. 6, 1977); for ion exchange in uranium purification (M. Streat, *J. Sep. Process Technol.*, 1980, Vol. 1, No. 3, p. 10); and for waste water treatment with activated carbon (R. L. Culp et al., *Handbook of Advanced Wastewater Treatment*, 2nd ed., Van Nostrand- Reinhold, New York, chap. 6, 1978), and (C. T. Lawson and J. A. Fisher, *AIChE Symp. Ser.*, 1974, Vol. 70, No. 136, p. 577), and (J. E. Parkhurst et al., *J. Water Pollut. Control Fed.*, 1967, Vol. 39, p. 10). The primary advantages of SMB or similar systems in ion exclusion are the lower requirements (i.e., reductions of greater than 50 percent) for amounts of resin, water, and energy.

SUMMARY OF INVENTION

In accordance with the teachings of the present invention, electrolytes such as sulfuric acid can be efficiently recovered from nonelectrolytes such as glucose through a procedure employing ion exclusion resins. Specifically, one aspect of the instant invention utilizes a standard column adapted with a specially designed fixed or floating head distribution plate and, in some cases, novel resin packing procedures to effectively eliminate dispersion resulting from dead volume effected by the shrinkage of the ion exclusion resin when exposed to strong electrolytes such as sulfuric acid. As previously discussed, the phenomenon commonly referred to in the art as dispersion is effected, at least in part, from mechanical shrinkage of a packed resin column. In the practice of ion exclusion technology, resins which are suitable for use therein are delivered by the manufacturer in dry form and must be activated before being packed into such columns by exposure to aqueous media provided with requisite $H^+$ ions in concentrations sufficient to convert the resin to its hydrogen form. For example, the dry resin may be introduced into a container and mixed with sulfuric acid. Although not widely appreciated by some researchers, the contact of such resins with the conversion material such as sulfuric acid causes a relatively significant change in effective volume by causing shrinkage of the individual resin particles. Subsequent to such conversion, however, the resin must be washed with hydrogen ion-free aqueous media as, for instance, water, to remove excess $H^+$ ions. Again, although not widely appreciated by some researchers, the subsequent washing of the resin, now converted to the hydrogen ion form, causes a reversal of the change in volume whereby the individual resin particles swell and thereby increase in size. The relative changes in volume, i.e., by either shrinkage or swelling can account for changes in total volume equivalent to about 20 percent. Subsequently, the resulting washed and swollen resin is packed into the column in a manner wherein no discontinuities or voids other than those normally attributable to packing volume are allowed. It will now be appreciated that when the resulting packed column is utilized for purposes of ion exclusion with a mixture such as acid and sugar as herein described, the exposure of the resin particles to the acidic component therein will cause same to shrink, thereby effecting a contraction of the column packing and consequently effecting a so-called dead volume at the uppermost portion thereof. It will also be appreciated as more of the acid/sugar mixture or hydrolyzate is added to the column, such shrinkage will be effected ultimately throughout the length of the column. Accordingly, the dead volume above the resin material will become a heel of acid/sugar feedstock of ever changing size and concentration as the acid component thereof moves rapidly through the intricacies comprising the packing volume throughout the column and the sugar molecules become defused into the resin microstructure. The net effect is to cause a volume of ever changing size and of ever changing mixture concentration in the heel interfaced with the top of the resin column so as to effect flattening and broadening of the elution profiles of both the acid and the sugar components, whereby the desired good species separation as clean cuts of two eluent streams is not realized. For a more complete understanding of the significance of dispersion, attention is directed to Nanguneri, S. R., "Design, Development and Analysis of a Preparative Scale Ion Exclusion Chromatography System," Ph.D Dissertation, The University of Southern Mississippi. Although such dissertation is not currently available to the public, it is scheduled to be logged into the University of Southern Mississippi library within calendar year 1993.

Practice of the instant invention through installation of the new instant device and/or application of the new instant packing procedures and techniques have been found to maximize the performance of the resin bed permitting thereby efficient operation of same at significantly higher feed volumes, flux rates, and electrolyte concentrations than heretofore obtainable in standard ion exclusion systems. Therefore, by eliminating the dead volume above the resin bed through the practice of the instant invention it is possible to more accurately mathematically model large-scale ion exclusion chromatography systems since dispersion caused by high acid concentrations, high flux rates, and large feed volumes can be readily predicted. In addition, as described herein, through the practice of the instant invention it is possible to achieve a significant performance enhancement in the operation of ion exclusion chromatography systems. In one embodiment thereof and through the proper design of a floating or bellows or otherwise actuated movement plate, it is possible to counter the effect of resin shrinkage which occurs when said resins are exposed to normal column cycling as described herein. The floating head design comprising one principal embodiment of the instant invention provides at or near the bottom portion thereof essentially a plane of contact for engagement with the resin particles at the top of the packed resin column. Means are provided in such floating head device for introduction of the acid/sugar mixtures or hydrolyzate into and through the floating head for sparging or distribution across preferably a substantial portion of the generally horizontal interface comprised of such resin particles and bottommost portion of the floating head plate means. As the acid constituent of the feedstock fed therethrough initiates shrinkage of the resin particles, any would-be dead volume thereover is immediately filled by downward movement of the floating head. Of course, as the resin particles are caused to further shrink and contract, the floating head means is arranged and provided with a convenient arrangement, such as proper design of effective specific gravity, or expanding springs or bellows, or other such means to continuously move freely within the column to maintain the interface between its bottommost portion and the top of the resin particles, thereby ensuring that no or substantially no dead volume is allowed to form from which the unwanted and undesired results of the phenomenon of dispersion can result. In short, such embodiment prevents establishment of any substantial depth or thickness of a homogeneous acid/sugar mixture interface between the top of the packed column and the bottom surface of the floating head device.

In a second embodiment of the instant invention, a fixed head distribution plate is employed when said resin is packed in its fully shrunken state in an ion exclusion column properly designed to compensate for the effects of channeling and increased pressure resulting from normal column cycling. In this second embodiment, the resin column is specially designed to work under conditions of increased pressure. After the resin has been converted to the hydrogen ion form and before it is washed with water, i.e., when it is in its total shrunken stage, the column is fully packed therewith and the new, instant pressure head is secured thereover as by bolting, clamping, or other convenient means for effecting a fixedly secured sealing means. Subsequently, the wash water is introduced into the top or the bottom of the column to thereby flush from the resin, converted to the hydrogen ion form, the unwanted excess of hydrogen ions. In this washing stage, of course, the resin tends to swell, but is mechanically restrained by means of the instant new pressure head and specially designed column. The resulting washed resin, now under pressure, is utilized essentially in the same manner for ion exclusion as described above by conveniently providing an eluent collection means whereby the first eluent stream of acid and the second and separate eluent stream of sugar are finally collected at atmospheric pressure.

If desired, the instant invention is utilized to effect and collect, for further processing, electrolyte and nonelectrolyte rich streams free of cross contamination. In practicing the instant invention, the fluid stream eluting from the packed resin bed has a varying composition with respect to fluid elution times. Thus, when the eluent leaving the resin packed column is rich in acid and contains no sugar, it can be diverted to an acid holding tank. Likewise, when the eluent is rich in sugar and contains no acid, it can be collected in a sugar holding tank. Thus, two streams can be considered to exit the column, first an acid stream and subsequently a sugar stream. Subsequent evaporation of water from either or both of the acid and sugar streams are used to obtain the acid or sugar concentration required for subsequent use in cellulose hydrolysis or sugar fermentation.

In a third and distinct embodiment of the instant invention, a novel open bed chromatography system is utilized to provide for even greater throughput of electrolytic solution. In this embodiment of the instant invention, no column is used but rather packets of resin. The packets of resin are dipped or otherwise immersed in the electrolytic solution, thereby, totally negating the effects of dispersion caused by high flux rates, large feed volumes, strong electrolyte concentrations, and dead volume. The immersed resin readily sorbs the nonelectrolytic species, just as in the closed bed system, but repulses the electrolytic species. Therefore, it is possible to remove the saturated packets and, through the use of separating means, including vacuum separation, collect the interstitial volume, which is, of course, more concentrated with the electrolytic species. The packets of resin are then washed with water, just as in the closed bed system, to remove the nonelectrolytic species. Like the SMB system, the open bed system is theoretically capable of reducing resin, water, and energy requirements by more than 50 percent.

OBJECTS OF THE INVENTION

It is therefore a principal object of the present invention to develop efficient and economical commercial-scale systems for separating electrolytes from nonelectrolytes in mixtures or hydrolyzates comprised, for instance, of acid and sugar by using a chromatographic method heretofore considered viable only for small-scale applications.

Another principal object of the present invention is to develop a chromatographic system which minimizes the use of a displacing fluid, such as water, to force a hydrolyzate through a resin bed to thereby reduce dilution of product streams with such displacing fluid.

Still another principal object of the present invention is to develop a chromatographic system that eliminates the need for conventional columns to preclude the dispersion caused by high flux rates, large feed volumes, strong electrolyte concentrations, and dead volumes.

Still further and more general objects and advantages of the present invention will appear from the more detailed description set forth in the following disclosure and examples, it being understood, however, that this more detailed description is given by way of illustration and explanation only and not necessarily by way of limitation, since various changes therein may be made by those skilled in the art without departing from the true scope and intent of the instant invention.

BRIEF DESCRIPTION OF THE DRAWINGS

The present invention will be better understood from a consideration of the following description taken in connection with the accompanying drawings in which:

As will be noted infra, several of these FIGURES, including at least FIGS. 6–12, are discussed in greater detail not only in the section immediately following, but also in the section containing several of the examples. For convenience to the reader, this dual detailed description is set forth at the end of the detailed description of each of said FIGURES.

DETAILED DESCRIPTION OF THE DRAWINGS

Figure 1:
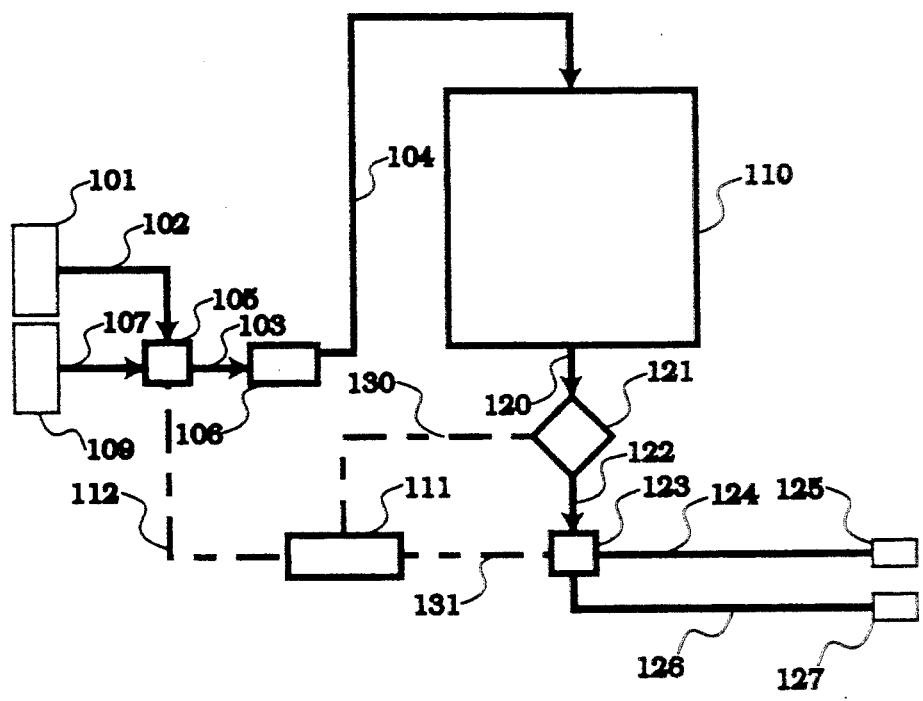
FIG. 1 is a simplified schematic illustration of a typical flowsheet of the single column batch feed arrangement generally illustrating the principles of the instant invention which effectively and efficiently separate electrolytes and nonelectrolytes, such as sugar/acid solutions or hydrolyzates into separate effluent streams having readily predictable and controllable elution times.

Referring now specifically to FIG. 1, an acid/sugar mixture or hydrolyzate from source 101 may be introduced via lines 102, 103, and 104 through flow control means 105 (a three-way solenoid valve preferred) and fluid moving means 106 (a positive displacement pump preferred) onto the top of ion exclusion column set 110. Column set 110 comprises either a single column, or several columns connected in series and packed with ion exchange resin. After introduction of a predetermined amount of said acid/sugar solution or hydrolyzate to column set 110, a reconfiguration of flow control means 105 by data acquisition and controller 111 illustrated as being in operable association with flow control means 105, by phantom line 112, permits flow of feed water from holding tank 109 via lines 107, 103 and 104 onto column set 110, again using fluid moving means 106. In column set 110, said predetermined amount of acid/sugar solutions or hydrolyzates are separated into their ionic and nonionic components with the ionic acid eluting first by virtue of its exclusion from the strongly acidic cation exchange resin via line 120 past acid/sugar detector 121, via line 122 past flow control means 123 (a three-way solenoid valve preferred) and via line 124 to acid hold tank 125. A decrease in the conductivity of such eluent, as sensed by detector 121 illustrated as being in operable association with data acquisition and controller 111 by phantom line 130, results in a reconfiguration of flow control means 123 illustrated as being in operable association with controller 111 by phantom line 131 to permit flow of eluent from exclusion column set 110 via line 120, 122, and 126 to sugar holding tank 127. During operation of column set 110, sugar, which had been retarded by preferential absorption by the resin, is flushed from column set 110 by the feed water entering from hold tank 109 via means 106. A drop in the optical activity of the effluent, which signals a corresponding drop of sugar concentration, is sensed by detector 121 and results in data acquisition and controller 111 returning the inlet and effluent flow control means 105 and 123 back to their initial positions.

Figure 2:
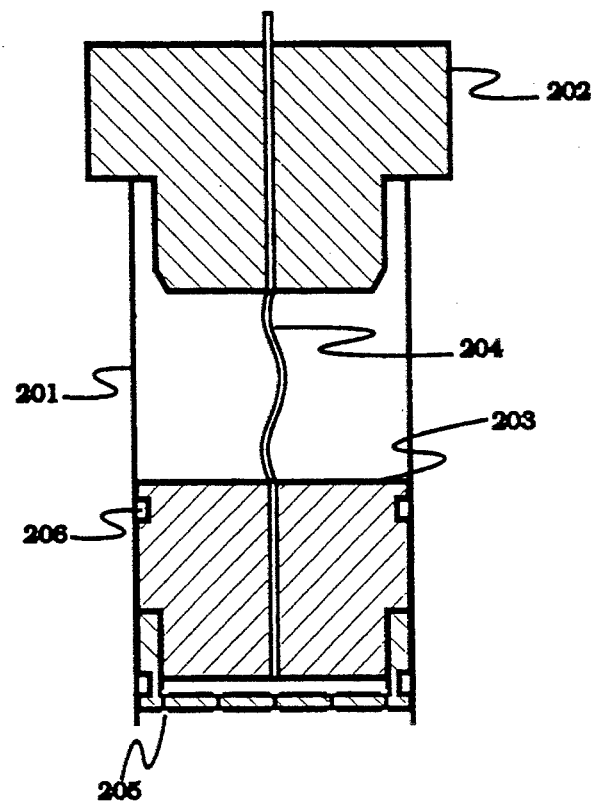
FIG. 2 represents one embodiment of the instant invention in cross sectional, side elevational view, taken along a line perpendicular to the longitudinal axis of the instant resin column with said line in a plane parallel to and coincident with said axis, wherein is depicted a floating head fluid feed arrangement used to prevent dispersion otherwise caused by dead volume resulting from resin shrinkage.

Referring now specifically to FIG. 2, dilution and dispersion caused by resin shrinkage which otherwise produces a fluid dead volume above the resin bed surface due to hydrolyzate feed to the column is eliminated, regardless of hydrolyzate feed conditions, by means and use of a floating fluid feed distribution device placed inside the column above the resin. The density of the feed distribution device is, or can be adjusted so as to float atop the resin as the resin bed changes in volume due to exposure to different acid environments. Floating feed distribution device 203 eliminates fluid dead volume above the resin which otherwise dilutes the feed fluid. For instance, fluid enters the top of column 201 through end cap 202 and is conveyed to floating feed distribution device 203 through a coiled section of silicon tubing generally shown at 204. Upon entering floating feed distribution device 203, the fluid moves downward to a plurality of fluid distributors, one of which is shown as 205, and which are located at the base of floating feed distribution device 203. In the practice of the instant invention, the deleterious effects of dispersion normally associated with the so-called dead volume is eliminated by maintaining the bottom surface of the base of floating feed distribution device 203 in contact with the upper surface of the bed of resin (not shown) which is maintained thereunder. Viton o-rings, one of which is generally shown at 206, permit floating feed distribution device 203 to move within column 201 without allowing backflow of the column contents past floating feed distribution device 203. The preferred procedure involves introducing the hydrolyzate to the ion exclusion column via a pumping means, not shown. Resin column 201 is used individually or connected in series with other like columns, not shown. Other tubing, not specifically shown, but connecting the appropriate column inlets and outlets, is preferably of small diameter to minimize the fluid volume located within the tubing.

Figure 3:
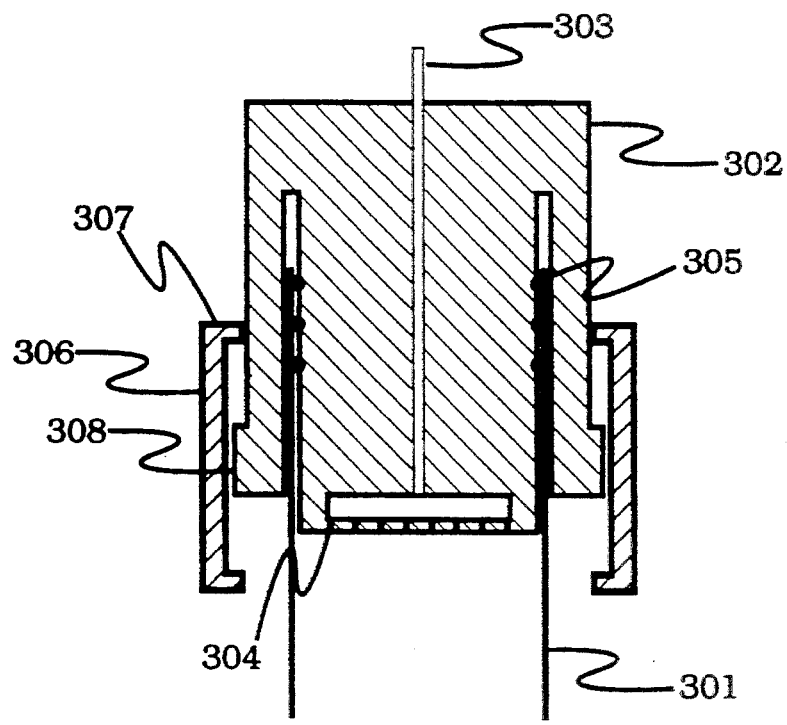
FIG. 3 represents another embodiment of the instant invention in cross sectional, side elevational view taken along a line perpendicular to the longitudinal axis of the instant resin column with said line in a plane parallel to and coincident with said axis, wherein is depicted an alternative floating head distribution plate design.

Referring now specifically to FIG. 3, therein is shown a floating fluid feed distribution device, different in design but similar in purpose to the floating feed distribution device described in FIG. 2, supra. The density of the feed distribution device is adjusted so as to float atop the resin as the resin bed changes in volume due to exposure to different acid environments. Fluid entering the top of column 301 through floating end cap 302 is conveyed through conduit 303 to a plurality of fluid distributors, one of which is shown for convenience as 304. Again, as in the device shown in FIG. 2, supra, the bottom surface, i.e. under the terminus of fluid distributor 304, is maintained in contact with the top of the resin bed (not shown) maintained thereunder. Viton o-rings, one of which is generally shown for convenience at 305, permit floating end cap 302 to move without allowing backflow of the column contents past floating feed end cap 302. Guide 306, guide stop 307, and floating end cap collar 308 are used to ensure that vertical movement of the end cap 302 is not hindered by skewing.

Figure 4:
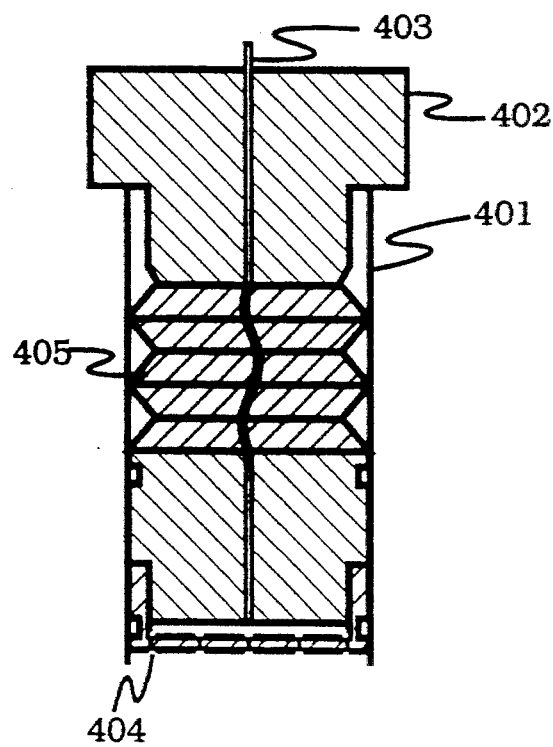
FIG. 4 represents still another embodiment of the instant invention in cross sectional, side elevational view taken along a line perpendicular to the longitudinal axis of the instant resin column with said line in a plane parallel to and coincident with said axis, wherein is depicted a pneumatically operated bellows drive means in operative association with the movable head.

Referring now specifically to FIG. 4, a performance enhancement device is to be used in conjunction with the floating feed distribution device of the instant invention, for example, the device described supra and depicted in FIG. 2, supra. Fluid entering the top of column 401 through end cap 402 is conveyed through conduit 403 to a plurality of fluid distributors, one of which is generally shown for convenience at 404. The position of the fluid distributors is controlled by a pneumatically operated bellows 405 which operates with air or liquid under pressure to effect inflation during periods of resin shrinkage, such as upon the addition of acid, and contracts during periods of resin swelling, such as upon addition of water. Although not shown, the bellows 405 may be in operable association with a pressure sensor within the column, which uses pneumatics to bellows 405 to maintain a desired pressure on pressures within column 401o Although also not shown, other driving devices might be substituted for bellows 7, such as a rust resistant spring.

Figure 5:
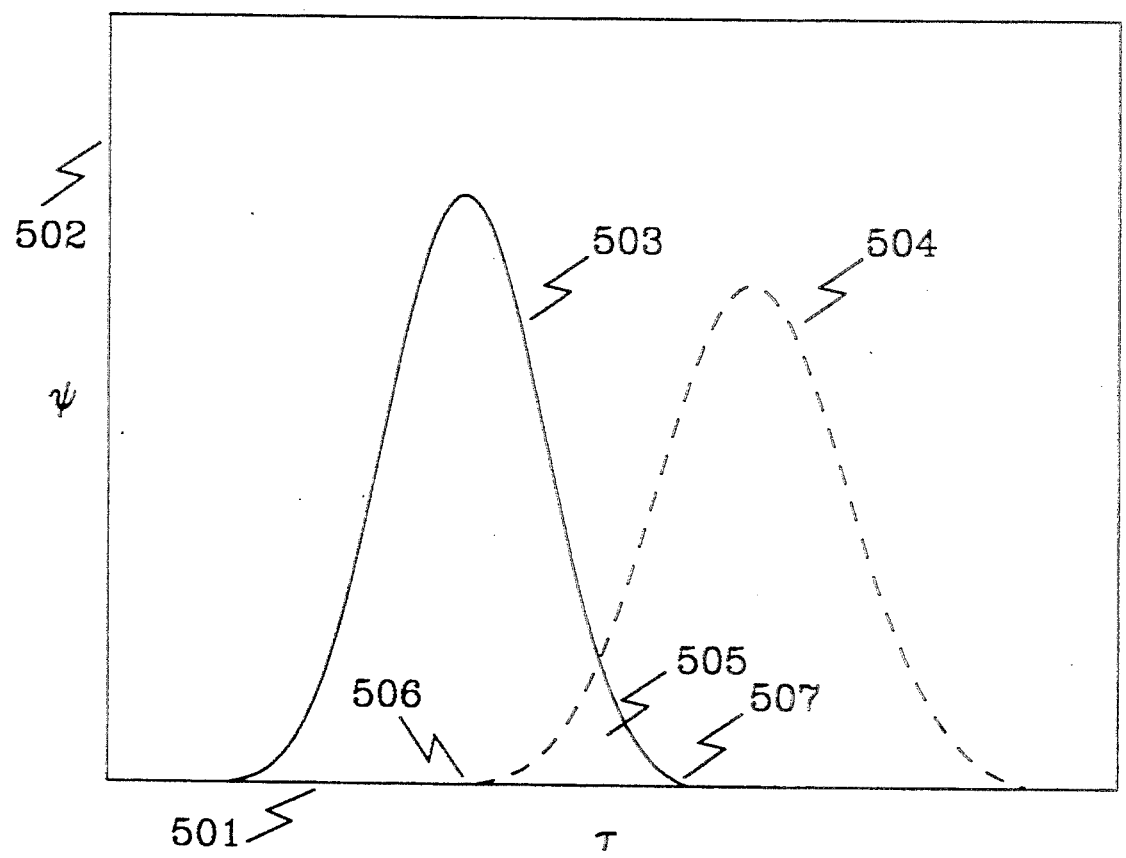
FIG. 5 is a graphical illustration depicting a typical chromatogram for an ion exclusion system.
Figure 6A:
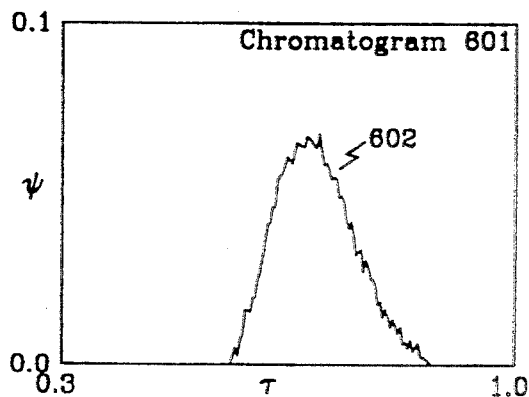
FIGS. 6A–6E are graphical illustrations of a series of chromatograms depicting the lack of effect of solute sugar concentration on column performance for the instant ion exclusion system.
Figure 6B:
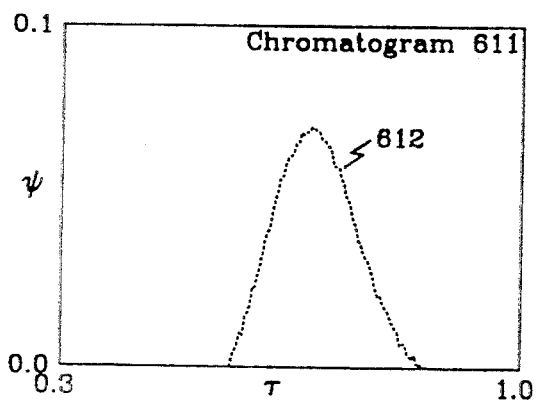
Figure 6C:
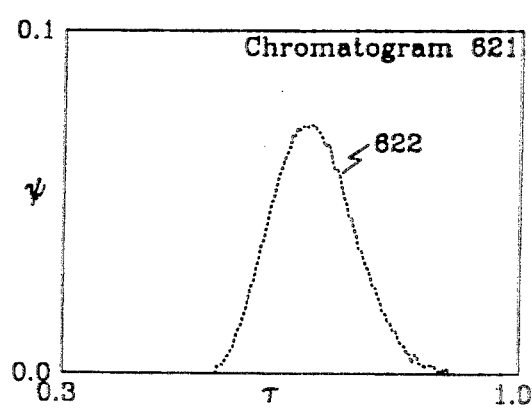
Figure 6D:
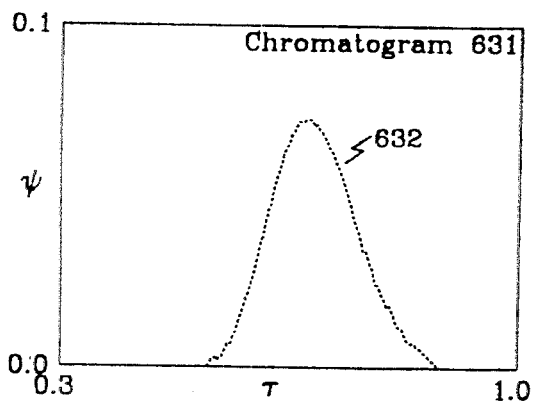
Figure 6E:
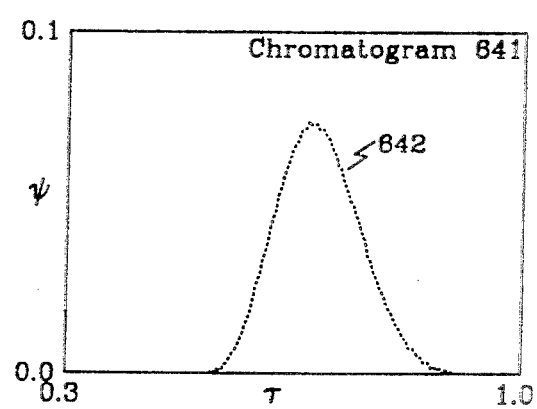
Figure 7A:
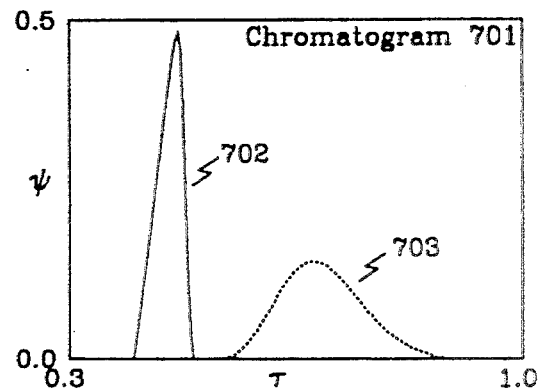
FIGS. 7A–7E are graphical illustrations of a series of chromatograms depicting the effect of solute acid concentration on acid/sugar elution profiles for the instant ion exclusion system.
Figure 7B:
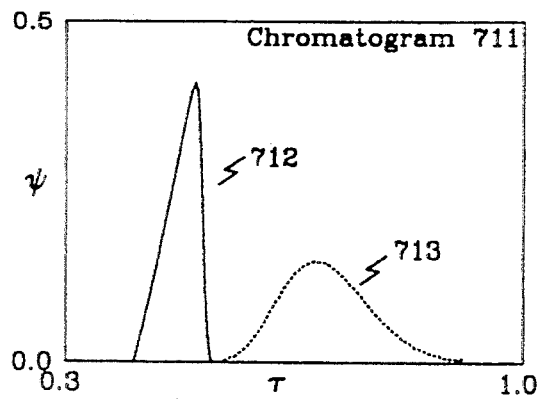
Figure 7C:
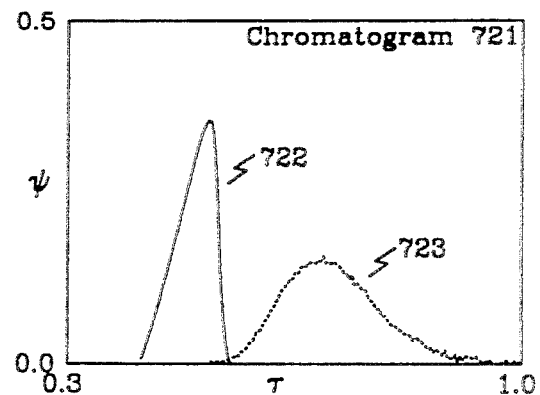
Figure 7D:
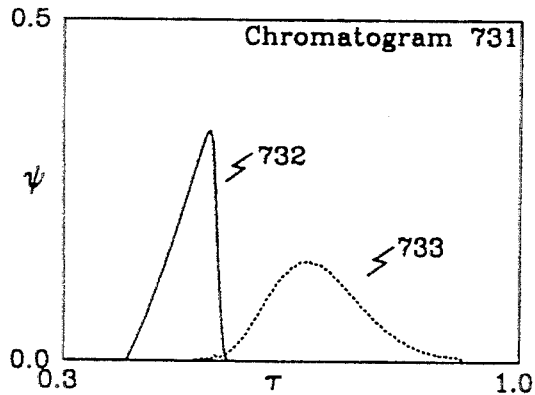
Figure 7E:
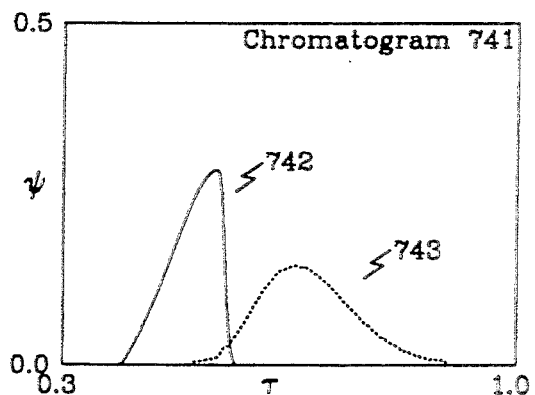
Figure 8A:
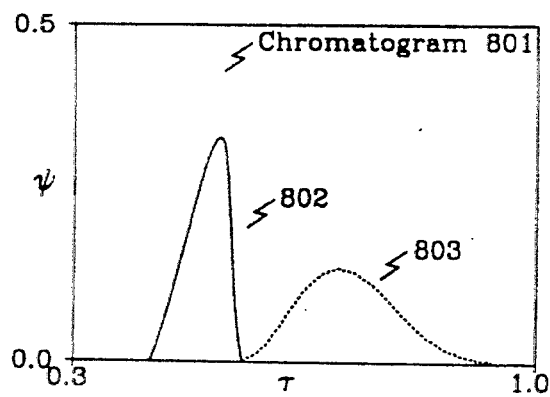
FIGS. 8A–8D are graphical illustrations of a series of chromatograms depicting the effect of fluid flux rate on acid/sugar elution profiles for the instant ion exclusion system.
Figure 8B:
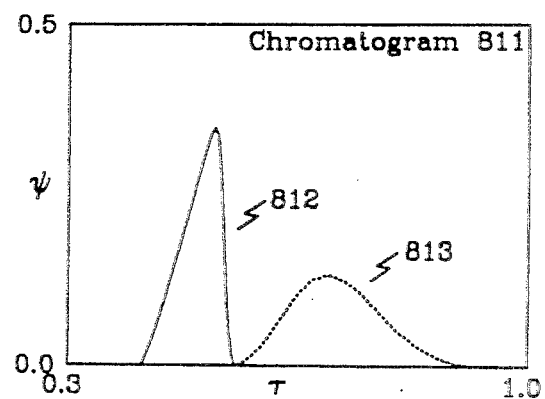
Figure 8C:
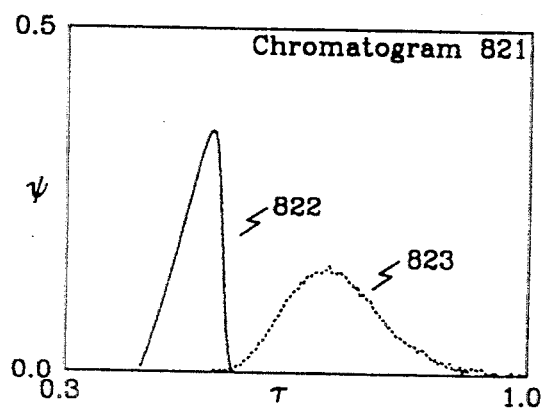
Figure 8D:
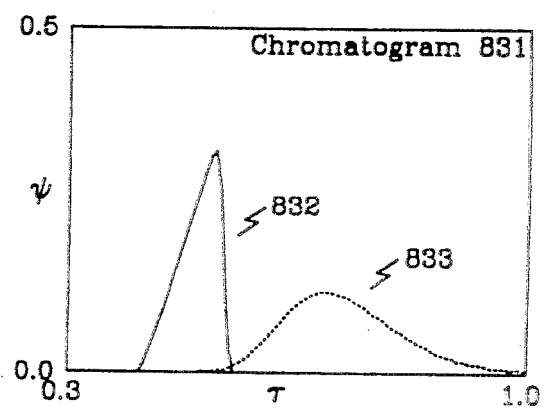
Figure 9A:
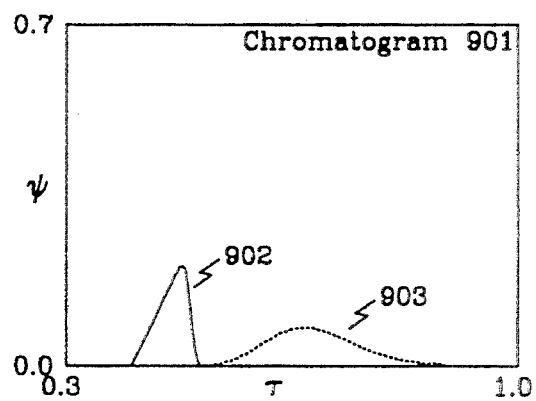
FIGS. 9A–9E are graphical illustrations of a series of chromatograms depicting the effect of feed volume size on acid/sugar elution profiles for the instant ion exclusion system.
Figure 9B:
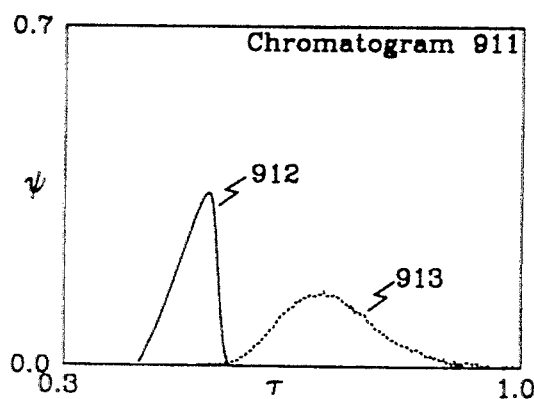
Figure 9C:
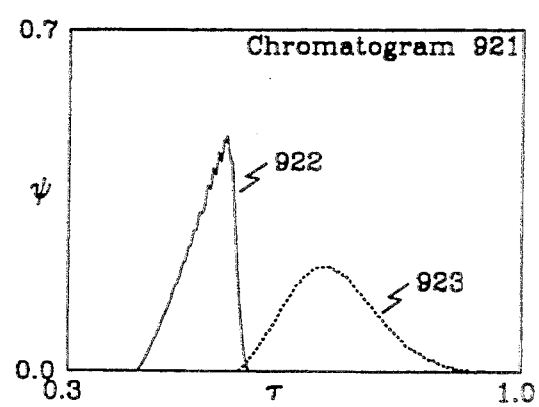
Figure 9D:
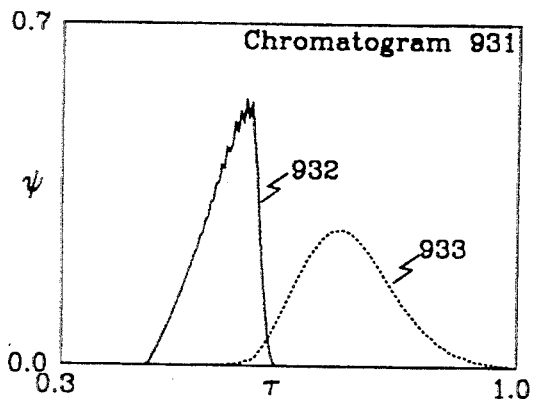
Figure 9E:
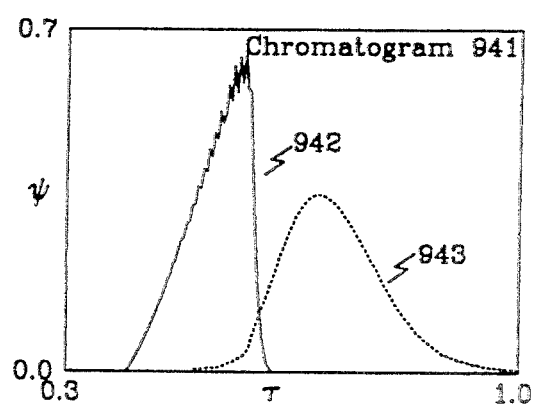

Referring now specifically to FIG. 5, therein is shown a typical chromatogram in a typical plane Cartesian coordinate system depicting the elution of the ionic and nonionic species from an ion exclusion column. It is noted that the separation performance in an ion exclusion process for a given set of operating conditions is quantitatively evaluated by using the information available from such elution chromatograms wherein, plotted on x-axis 501, is dimensionless time, $\tau$, defined as the ratio of total eluent volume to total fluid volume present in the packed column and wherein, plotted on y-axis 502, is dimensionless concentration, $\psi$, defined as the ratio of eluent species concentration to species feed concentration. If Q is the volumetric flow rate, and t is the time elapsed from the start of acid and sugar solution feed injection through a column of cross-sectional area, S, and length L, which is packed with resin having an average macropore volume fraction, $\alpha$, and an average micropore volume fraction, $\beta$, then $\tau$ is expressed by the equation $$\tau = QT/[(\alpha+\beta)SL]$$

As the ionic acid and nonionic sugar elute from the column, dimensionless concentration versus dimensionless time profiles 503 and 504, respectively, are produced. The separation performance is evaluated by observing the maximum peak heights ($\psi$max) of the individual species profiles and the degree of species separation ($\Delta\tau AS$). Degree of species separation is defined as the dimensionless elution time at the start of sugar elution, 506, less the dimensionless elution time for the end of acid elution, 507. As shown in FIG. 5 at region 505, cross-over contamination of one eluting species by the other occurs when column separation performance is insufficient. Proper practice of the instant invention can be used to minimize or eliminate the contamination of the eluting sugar species by small amounts of acid. For ideal separation performance, high eluent concentration values ($\psi$max approaching 1), and separation between eluting species ($\Delta\tau AS$ values greater than or equal to zero) are desired. If $\Delta\tau AS$ is less than zero, as shown in FIG. 5, only partial separation of components has occurred. If $\Delta\tau AS$ is greater than zero, there is a time period (or elution volume) which has elapsed after the first species (acid) completely eluted and before the second species (sugar) began eluting. This unnecessary time lapse between eluting species would result in lower production rates and thus unfavorable process performance. Enhanced performance of the instant invention is characterized by narrow chromatograms having large peak heights and $\Delta\tau AS$ values close to zero.

Referring now specifically to FIGS. 6A–6E, therein are shown five separate sugar solute elution chromatograms: 601, 611, 621, 631, and 641 depicting the effect of feeding to the top of a column 4, 6, 8, 10, and 12 percent sugar (by weight) solution, as represented by 602, 612, 622, 632, and 642, respectively, on the solute elution profiles at a constant flux rate and feed volume. As evidenced by the chromatograms, which were generated using the preparative-scale chromatography unit employing a floating head distribution plate, sugar feed concentration has no effect on the sugar elution times or the chromatogram shape. Chromatograms obtained with the fixed head distribution plate unit were not significantly different than the preparative-scale unit.

For a better understanding of just how the information shown in FIGS. 6A–6E is applicable to practice of the instant invention, and further for the convenience of the reader, the information comprising same is again discussed below in connection with Example I.

Referring now specifically to FIGS. 7A–7E, which represent five separate acid/sugar chromatograms: 701, 711, 721, 731, and 741 depicting the effect of feeding to the top of a column 2, 4, 6, 8 and 12 percent sulfuric acid (by weight) on solute elution profiles at a constant 8 percent sugar concentration, flux rate, and feed volume. The chromatograms were generated using the preparative-scale ion exclusion system equipped with a floating head distribution plate. There was no significant difference between the chromatograms generated by the floating and fixed head distribution plate systems. As may be appreciated from chromatogram 701, solid line 702 represents the acid elution curve at 2 percent acid while dashed line 703 represents the 8 percent sugar elution curve. Similarly, chromatograms 711, 721, 731, and 741 depict the solute elution profiles for 4, 6, 8, and 12 percent acid respectively. As evidenced by the chromatograms, which show a progressive decrease in acid profile height and a broadening of the profile width, separation efficiencies decrease with higher acid concentration. As may be appreciated by those skilled in the art, concomitant dispersion resulting from fluid dead volume has been essentially eliminated by practice of the instant invention, thereby permitting greater separation performance of the ionic and nonionic species and providing greater predictability of column performance.

Referring now specifically to FIGS. 8A–8E, therein are shown four separate acid/sugar chromatograms: 801, 811, 821, and 831 depicting the effect of fluid flux rate on the solute elution profiles at constant acid/sugar concentrations and feed volumes using the present invention. The chromatograms were generated using the preparative-scale ion exclusion system equipped with a floating head distribution plate. There was no significant difference between the chromatograms generated by the floating and fixed head distribution plate systems. As may be appreciated from chromatogram 801, solid line 802 represents the acid elution curve and dashed line 803 represents the sugar elution curve at a fluid flux rate of 0.585 cm/min. Similarly, chromatograms 811, 821, and 831 depict the solute elution profiles at 0.760, 0.852, and 1.257 cm/min, respectively. As evidenced by the chromatograms, no change is observed in the acid elution time; however, as predicted by theory, shorter and broader sugar profiles are observed at higher fluid flux rates resulting in a decrease in separation efficiency. As may be appreciated by those skilled in the art, concomitant dispersion resulting from fluid dead volume has been essentially eliminated by application of the instant invention, thereby permitting greater separation performance of the ionic and nonionic species and providing greater predictability of performance.

For a better understanding of just how the information shown in FIGS. 8A–8D is applicable to practice of the instant invention, and further for the convenience of the reader, the information comprising same is again discussed below in connection with Example II.

Referring now specifically to FIGS. 9A–9E, therein are shown five separate hydrolyzate acid/sugar chromatograms: 901, 911, 921, 931, and 941, depicting the effect of feed volume on solute elution profiles at constant acid/sugar concentration and flux rate using the present invention. The chromatograms are generated using the preparative-scale ion exclusion system equipped with a floating head distribution plate. There is no significant difference between the chromatograms generated by the floating and fixed head distribution plate systems. As may be appreciated from chromatogram 901, solid line 902 represents the acid elution curve and dashed line 903 represents the sugar elution curve at a feed volume of 1 percent. Similarly, chromatograms 911, 921, 931, and 941 depict the solute elution profiles at 2, 3, 4, and 5 percent feed volume, respectively. As predicted by theory and evidenced by the chromatograms, sugar as well as acid profile heights and widths increase proportionally with feed volume resulting in decreased separation efficiencies at higher feed volumes. As may be appreciated by those skilled in the art, concomitant dispersion resulting from fluid dead volume has been essentially eliminated by application of the instant invention thereby permitting greater separation performance of the ionic and nonionic species and providing greater predictability of performance.

For a better understanding of just how the information shown in FIGS. 9A–9E is applicable to practice of the instant invention, and further for the convenience of the reader, the information comprising same is again discussed below in connection with Example III.

Figure 10A:
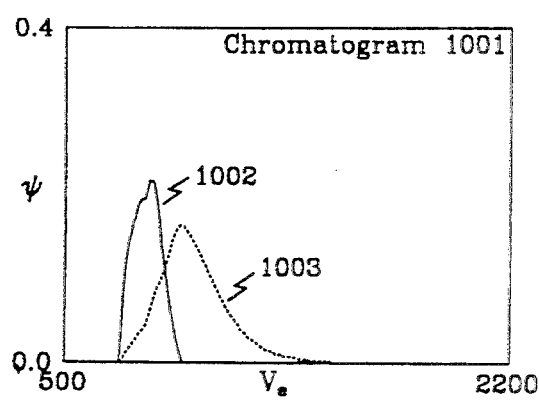
FIGS. 10A–10C are graphical illustrations of a series of chromatograms depicting the effect of divinylbenzene cross-linking of resin on acid/sugar elution profiles for the instant ion exclusion system.
Figure 10B:
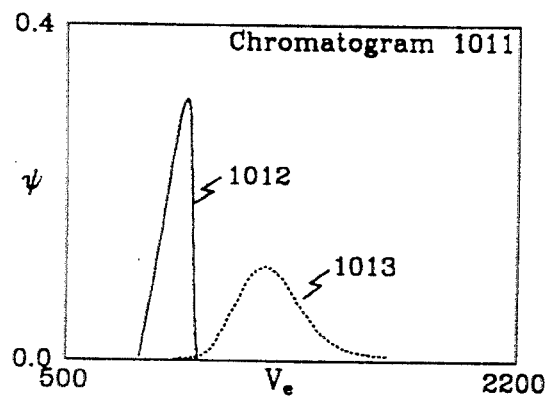
Figure 10C:
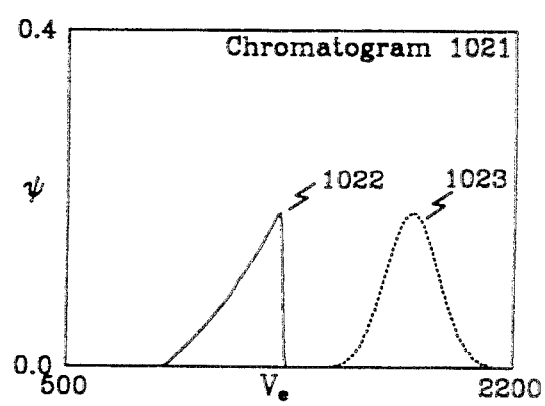
Figure 11A:
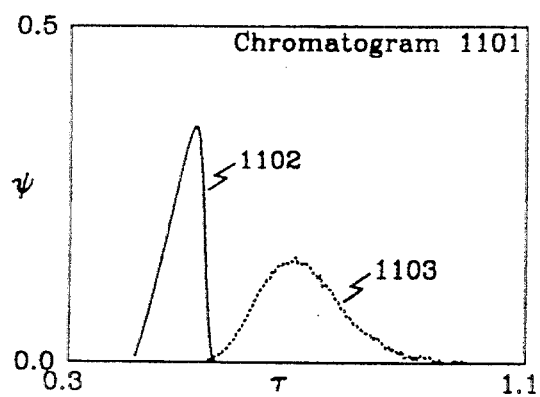
FIGS. 11A–11D are graphical illustrations of a series of chromatograms depicting the effect of column length on acid/sugar elution profiles.
Figure 11B:
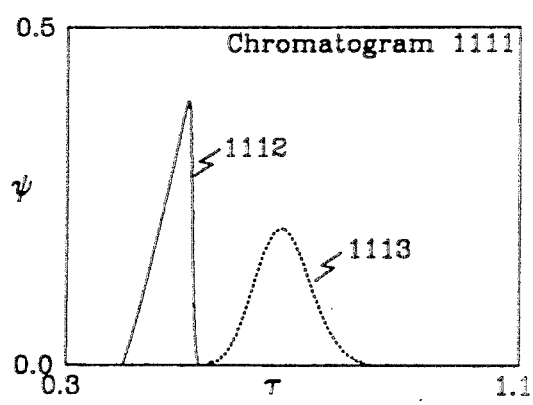
Figure 11C:
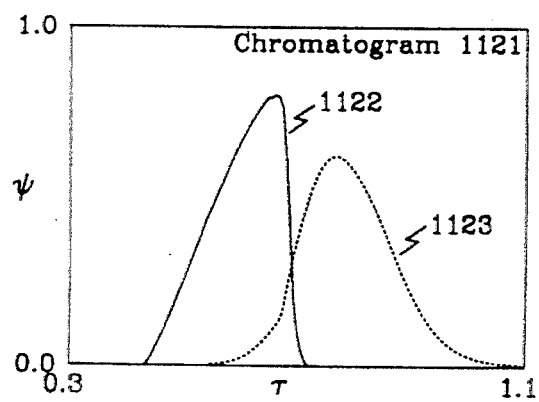
Figure 11D:
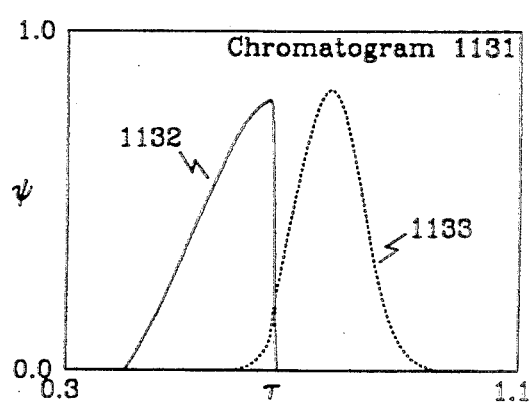

Referring now specifically to FIGS. 10A–10C, therein are shown three acid/sugar chromatograms: 1001, 1011 and 1021 depicting the effect of resin divinylbenzene cross-linking on solute elution profiles at constant acid/sugar concentration, flux rates, and feed volumes using the instant invention. Plotted on the abscissa of these chromatograms is elution volume in milliliters. As may be appreciated from viewing chromatogram 1001, solid line 1002 represents the acid elution profile and dashed line 1003 represents the sugar profile using a resin containing 8 percent divinylbenzene cross-linking. Similarly, chromatogram 1011 and 1021 depict the solute elution profiles of resins containing 4.5 and 2.0 percent divinylbenzene cross-linking, respectively. As predicted by theory and evidenced by the chromatograms, separation efficiency tends to increase with a decreased cross-linking. As may be appreciated by those skilled in the art, concomitant dispersion resulting from fluid dead volume has been essentially eliminated by application of the instant invention, thereby permitting greater separation performance of the ionic and nonionic species and providing greater predictability of performance.

For a better understanding of just how the information shown in FIGS. 10A–10C is applicable to practice of the instant invention, and further for the convenience of the reader, the information comprising same is again discussed below in connection with Example IV.

Referring now specifically to FIGS. 11A–11D, which represent four acid/sugar chromatograms: 1101, 1111, 1121, and 1131 depicting the effect of column length on solute elution profiles at two different feed volumes (2 and 10 percent) and at constant acid/sugar concentrations and flux rates using the present invention. As may be appreciated from chromatogram 1101, solid line 1102 represents the acid elution profile and dashed line 1103 represents the sugar elution profile of a single column system at 2 percent feed volume. Similarly, chromatogram 1111 depicts the solute elution profiles of a two-column system (twice the length of a single column system) at 2 percent feed volume, chromatogram 1121 depicts the solute elution profiles for a single column system at 10 percent feed volume, and chromatogram 1131 depicts the solute elution profiles for a two-column system at 10 percent feed volume. As evidenced by chromatograms 1101 and 1111, increasing column length results in more efficient solute separation. As evidenced by chromatograms 1121 and 1131, increasing feed volume results in a decrease solute separation efficiency; however, the increased column length of the two column system provides superior performance over the single column system. As may be appreciated by those skilled in the art, concomitant dispersion resulting from fluid dead volume has been essentially eliminated by application of the instant invention, thereby permitting greater separation performance of the ionic and nonionic species and providing greater predictability of performance.

For a better understanding of just how the information shown in FIGS. 11A–11D is applicable to practice of the instant invention, and further for the convenience of the reader, the information comprising same is again discussed below in connection with Example V.

Figure 12:
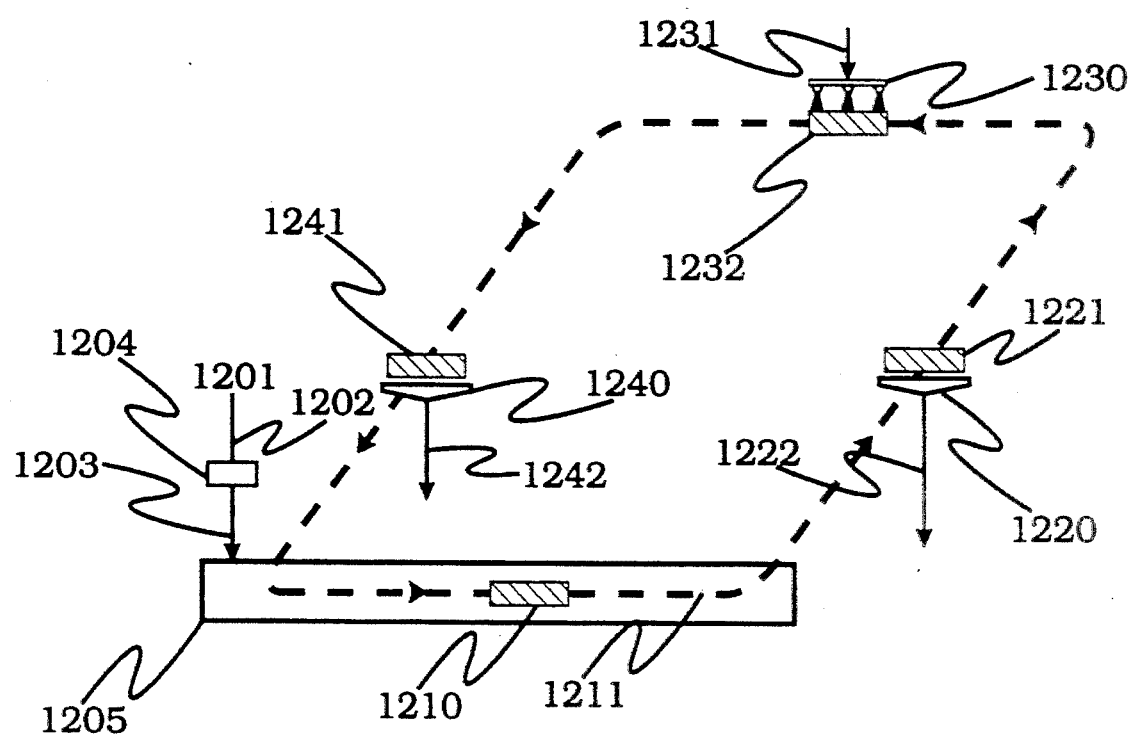
FIG. 12, which is a diagrammatic and fragmentary illustration, to an enlarged scale, of only certain portions of the continuous feed open bed arrangement generally illustrating the principles of one of our more advanced process embodiments which separates electrolytes and nonelectrolytes, such as sugar/acid solutions or hydrolyzates into separate effluent streams.

Referring now specifically to FIG. 12, an acid/sugar mixture or hydrolyzate from a source shown as 1201 may be introduced via lines 1202 and 1203, as well as flow control means 1204 into a plurality of packets of ion exclusion resin, one of which is shown for convenience at 1210. The packets are moved by translocation means 1211 through vessel 1205 where the acid/sugar solution or hydrolyzate introduced thereinto saturates the resin in such packet. Through continual operation of translocation means 1211 which can, for convenience, comprise a conveyor means such as an endless belt, the resulting saturated resin in each such resin packet 1210 is subsequently, as shown for resin packet 1221, brought into operable association with vacuum separation means 1220, where the acid/sugar or hydrolyzate present in the interstitial volume of the resin is drawn off via line 1222 to, for example, a secondary open bed unit or to an electrolyte hold tank, not shown. Each such resin packet, as illustrated at 1221, is subsequently transported by translocation means 1211 to wash means 1230 where water or sugar solution from another separation unit (not shown) but operating downstream and in series with the unit shown herein is introduced via line 1231 onto resin pack 1232 herein shown in operable association with wash means 1230 to thereby soak same and thereby remove most of the sugar present in the micropore volume of the resin. The resulting soaked resin bundles are subsequently transported by translocation means 1211 to vacuum separation means 1240 where the liquid filling the interstitial volume of each resin packet or bundle (one of which bundle is shown as 1241 to be in operable association with said separation means 1240) is removed either to another separation unit, not shown but operating upstream and in series with the unit herein shown or as a product of the system via line 1242.

As the unit described herein cycles, packet 1210 is conveyed by translocation means 1211 to vacuum separation means 1220. The conveyance of packet 1210 is accomplished concurrently with the conveyance of packet 1221 to wash means 1230, the conveyance of packet 1232 to separation means 1240, and the conveyance of packet 1241 through vessel 1205.

DESCRIPTION OF THE PREFERRED EMBODIMENTS

In one of the principal embodiments for effective practice of the instant invention, a floating head distribution plate was used to prevent the evolution of a dilution layer, caused by the shrinkage of the resin bed, within the column. Research and development of the floating head distribution design was conducted in a preparative-scale apparatus.

The preparative-scale ion exclusion system, constructed as shown by FIG. 1, was comprised of the following elements: eluent and acid/sugar feed reservoirs, a positive displacement pump, five 50 mm in diameter columns packed with a strongly acidic cation-exchange resin, a conductivity meter and a polarimeter, and an external temperature controller to maintain constant temperature in the two detectors. All fittings in contact with the eluent were either glass, polypropylene, silicone rubber, polytetrafluoroethylene, or stainless steel to resist acid corrosion.

The several columns (of the column set) were connected in series by means of a minimum amount of small diameter silicon tubing to minimize fluid volume between columns. All columns were constructed of glass or PVC and measured 1200 mm in length. Column packing procedures were those recommended by the resin manufacturers. In accordance with resin manufacturers' recommendations, column bed preparation was started by packing wet ion exclusion resin into a column and then initiating flow of deionized water onto the column. After ten to twenty hours of fluid flow, additional resin was added to the column to fill any voids created by settling of the resin bed. This process was repeated until a stable resin bed volume was established. Each column had caps at both ends made of polytetrafluoroethylene. A fritted glass plate was seated above each bottom cap to hold the resin while permitting fluid flow out of the column.

A Scientific System Model 300 LC positive displacement pump was used for feed injection, as well as for water flow to the column between injections. A three-way valve that could be switched between synthetic electrolyte solutions or actual hydrolyzates and water reservoirs to the pump was incorporated. The pump also had an injection feed port to remove any air bubbles present. The pump had a flow rate capacity ranging from 0.1 to 30 ml/min. At operating flow rates of approximately 20 ml/min, pump pressure never exceeded 50 psi even when using five packed columns in series. Flow rates, measured as volume of fluid collected with respect to time, were constant at all pump rate settings. The pump was equipped with a built-in coil that dampened fluid pulses and produced consistent flow rates.

The system's polarimeter and conductivity meter were accessed through an RS232 interface with a XT computer. Software for the initial setup, control, operation, data acquisition, termination, and data storage and retrieval was coded. The source code for this program was written in MODULA. The readings from the two detectors were monitored as a function of elution time by taking measurements about 20 seconds apart with single column experiments and about 40 seconds apart for experiments with two or more columns in series. The detector sample time spacing ensured continuity of the chromatograms of both the acid and sugar species.

A Kyoto Electronics CM-117 conductivity meter was used as an acid detector in the system. The conductivity meter was a computerized, fully automatic multifunctional instrument capable of providing accurate conductivity measurements over a wide range (i.e., 0-1000 ms/cm).

A JASCO Model DIP-370 digital polarimeter was selected for the system as a sugar detector. The polarimeter automatically measured and displayed optical and specific rotation, sugar concentrations, and cell temperature. The polarimeter and conductivity meter were maintained at a constant temperature of 26° C.

The polarimeter was sensitive to all eluting species having chiral molecules that exhibit optical activity. The conductivity meter was sensitive to eluting species that increase or decrease fluid electrical conductivity. Most acids ionize and cause an increase in conductivity, while nonionic species cause a decrease in electrical conductivity.

The columns were packed with different resins to test for their separation performance. These resins used were strongly acidic, cation-exchange sulfonated polystyrene types differing in their percent DVB cross-linking. The commercial grades utilized were Rohm and Haas Gel type Amberlyte IR 120 H+ (8.0% DVB, 25-50 mesh), IR 118 H+ (4.5% DVB, 25-50 mesh), and DOW grade Gel type DOWEX 50W H+ (2% DVB, 50-100 mesh).

Aqueous solutions of analytical grade sulfuric acid and sugars were prepared in deionized water from a Barnstead Nanopure water purification system. Model fluids varied in both acid and sugar concentration. Sulfuric acid concentrations ranged from 0.5 to 16 percent by weight. Glucose concentrations ranged from 4.0 to 12.0 percent by weight. Injection feed volumes ranged from 1.0 to 10.0 percent of empty column volume. Feed injections were followed by elution with deionized water.

To illustrate operation of the floating head distribution plate, a typical run of the preparative-scale system was be used. Operation began with the preparation of a synthetic electrolytic solution. The synthetic solution consisted of reagent grade sulfuric acid, deionized water, and glucose. In those cases when actual hydrolyzates were used, filtration of the hydrolyzates was conducted to remove fine particulate matter therein. The synthetic solution or hydrolyzate was stored in a 19-liter plastic container. Deionized water was stored in a second 19-liter container. The quantity of synthetic solution or hydrolyzate stored depended on the feed volume selected for the run, typically 5 to 10 percent of total column volume. Feed of synthetic solution or hydrolyzate and deionized water to the column was accomplished through silicone tubing connected to the base of the storage containers. The tubing from each container was connected to a three-way electrically operated solenoid valve. At the start-up of the preparative-scale unit, the three-way valve was positioned by means of a manually operated electrical switch to permit flow of synthetic solution from the storage container to a positive displacement pump. The pump used in the operation of the preparative-scale system was a Cole-Palmer Model No. 7520-35. The pumping rate was set according to a desired flux rate for the column, typically around 10 to 20 ml/min. Synthetic solution or hydrolyzate was conveyed from the pump to the column through an additional length of silicone tubing. The tubing that ran from the 3-way valve to the column via the pump was used for both synthetic solution or hydrolyzate and deionized water. Synthetic solution or hydrolyzate was pumped into the column until the desired feed volume was reached, typically 3 to 5 percent. Resin packing procedures for the columns used in the preparative-scale system were those supplied by the manufactures of the various resins. No special procedures were required for the packing and it was not necessary to repack columns between experiments. Following the addition of the synthetic solution or hydrolyzate, the 3-way valve was reconfigured to permit flow of deionized water from the container to the column via the positive displacement pump.

As the synthetic solution or hydrolyzate entered the column and the resin bed shrunk due to the presence of acid, the floating head distribution plate, depicted in FIG. 2, supra, due to its specific gravity (approximately 1.2) and design, effectively prevented the formation of a dilution layer above the bed. In-line instrumentation was used to determine the optical rotation and conductivity of the eluting solution. A Kyoto CM-117 conductivity meter and Jasco DIP-370 polarimeter were used to determine the presence of acid and sugar, respectively, in the eluting solution. As the conductivity of the eluting solution rose indicating the presence of acid, that solution was directed, by means of a second 3-way valve at the discharge of the columns, to the acid storage container. As the conductivity dropped to a predetermined level indicating the disappearance of acid and the optical rotation of the eluting solution increased, indicating the presence of sugar, the 3-way valve at the discharge of the column was reconfigured to direct flow to the sugar solution container. Feed water required to elute sugar for the column was typically three times that of the feed volume of synthetic solution or hydrolyzate. As the optical rotation of the eluting solution decreased indicating the disappearance of sugar, the inlet and discharge 3-way valves were reconfigured to their original position to permit another feed volume of synthetic solution.

Although not used in the preparative-scale work, the more advanced floating head distribution plate arrangement, illustrated in FIG. 3 supra, is also a viable option. Due to the external guide and restrainer, arrangements of this design have the advantage of making the distribution plate less susceptible to skewing. Skewing results in the distribution plate "hanging" within the column and, thereby, preventing free movement. Another possible distribution plate arrangement is depicted in FIG. 4. In this arrangement, a pneumatically operated bellows is placed between the column end cap and the distribution plate. A pressure sensor within the column acts upon a pressure control valve arrangement to maintain a constant pressure within the column. The pressure control valve either inflates the bellows by permitting plant air into the bellows or deflates the bellows by venting air.

In a second principal embodiment of the instant invention, a 10 cm diameter column measuring 305 cm in length was constructed using a fixed head distribution plate and four equally spaced redistribution plates within the column. The fixed head plate and redistribution plates were installed within the column to prevent the deleterious effects of dispersion caused by shrinkage of the resin and channeling of the process fluid along the walls of the column, respectively. In this embodiment of the instant invention, the resin used was packed in the column in a fully shrunken form. To achieve this, the resin was soaked in an aqueous solution of hydrochloric acid. The resin was then packed into the column under these conditions. Redistribution plates were installed in the column prior to packing to prevent channeling of the process fluid along the walls of the column. The column, which was constructed from schedule 80 chlorinate polyvinyl chloride (CPVC), was capable of withstanding pressures up to 325 psi at about 25° C. Back pressures experienced during operation of the column did not exceed 100 psi. Fluids were pumped through the column at 50 to 70 ml/min using a Tuthill Pump Company, model PDMM 9250 CV, gear pump.

The Koyoto Electronics CM-117 conductivity meter and Jasco model DIP-370 digital polarimeter used in the preparative-scale column operation described supra were also employed for the 10 cm column operation. Data from these instruments were supplied to a Dow Chemical Company's CAMILE, model 2000, data acquisition and control system, which was selected to monitor and control the operation of the column and ancillary systems. In addition to the conductivity meter and digital polarimeter, the data acquisition and control unit also controlled positioning of the system's flow control devices, as well as monitored and actuated the system's Barnstead Ultropure/Epure water purification system.

As is widely known, simulated moving bed systems, to which the first two embodiments of the instant invention can be applied, offer the advantages of greater resin utilization and less water usage. However, as with all closed bed systems, dispersion caused by high flux rates, feed volumes, and acid concentrations, is observed. A third principal embodiment of the instant invention utilizes a novel open bed chromatography system technology. An open bed chromatography system, such as the one described supra, offers the advantages of a simulated moving bed system without the problems of that closed bed chromatography system. By staging the open bed chromatography process, that is, using the discharge stream of one open bed system train as the feed stream of another train, it is possible to reduce, by over 60 percent, the feed water requirements of the overall system. If less feed water is used to remove sugar from the resin, the energy requirements to concentrate the sugar solution are proportionally less. Unlike a closed bed chromatography system, there is no potential for dispersion caused by flux rates or feed volumes since the resin packets are immersed and there is no flow within a column. However, just as in a closed bed chromatography system, there is a limitation on acid concentration due to shrinkage of the resin.

In this embodiment of the instant invention, a shallow resin bed is first saturated with a solution containing both ionic and nonionic species, such as hydrolyzate. The nonionic sugar species penetrates into the porous resin. However, because of ion exclusion, acid is restricted to the interstitial fluid volume located between resin particles. After equilibrium has been established, the resin bed interstitial fluid, which has been partially depleted of sugar, is removed by vacuum or pressure means. Therefore, after vacuum removal of the interstitial fluid, the resin is rich in sugar content and contains only a minimal amount of acid.

The resin is then saturated with rinse water. Sugar remaining within the resin pore volume diffuses into the water located in the resin interstitial volume. After equilibrium is again established, sugar concentration is uniform throughout all fluid within the resin bed. A second vacuum of the resin bed collects the interstitial fluid which now contains only sugar. This fluid is the sugar rich product stream. The process cycle is complete and the resin bed is ready to be again saturated with hydrolyzate.

A mathematical model of the open bed chromatography system described, supra, demonstrates that this embodiment of the instant invention can enhance electrolyte separation by ion exclusion. A typical chromatography resin bed volume is about 40 percent interstitial volume, 40 percent pore volume, and 20 percent resin polymer. Therefore, if perfect vacuum removal of the interstitial fluid volume is assumed, each open bed chromatography cycle of 1.25 resin bed volumes has the potential to remove 25 percent of the sugar contained in one bed volume of hydrolyzate. This sugar extraction requires only 0.5 resin bed volumes of water. Thus, water usage is significantly less than with conventional resin packed column chromatography that typically use 2.5 to 3 resin bed volumes of water for the same sugar recovery. In this embodiment of the instant invention, acid remains with the hydrolyzate in the open bed process and is not diluted by the rinse water introduced into the process. This is another advantage of this aspect of the instant invention when compared to a column chromatography process which dilutes the acid with water.

EXAMPLES

In order that those skilled in the art may better understand how the present invention may be practiced, the following examples are given by way of illustration only and not necessarily by way of limitation, since numerous variations thereof will occur and will undoubtedly be made by those skilled in the art without departing from the true scope of the instant invention herein taught and disclosed.

In the test procedures used to generate the data found in Examples I-VI, infra, and unless otherwise indicated, the following procedures and/or facilities were utilized. Acid and sugar elution chromatograms were generated at room temperature using the ion exclusion system described below by varying process operating conditions, resin type, and hydrolyzate feed amount and composition.

A Scientific System Model 300 LC positive displacement pump was used for acid/sugar solution feed injection, as well as for water supply requirements. A three-way valve was used to switch between feed solution and water reservoirs. The pump had a flow rate capacity ranging from 0.1 to 30 ml/min.

A model CM-117 fluid conductivity meter manufactured by Kyoto Electronics of Tokyo, Japan was used to detect acid in the eluent stream. This detector did not sense the presence of sugar in the eluent stream.

A Jasco Model DIP-370 digital polarimeter was used to sense the presence of sugar in the eluent stream. This detector measures fluid optical activity and thus only detects the optically active sugar species. Both detectors were maintained at 26°±1° C. by means of a VWR Model 1165 refrigerated constant temperature circulator.

The polarimeter and conductivity meter were accessed through an RS232 interface to an XT computer.

The readings from the two detectors were monitored as a function of elution time. Plots of detector response versus time or elution volume are referred to as chromatograms.

Species eluting from the resin packed columns are acids and sugars in an aqueous media. The polarimeter is sensitive to all eluting species having chiral molecules (like most sugars) that exhibit optical activity. The conductivity meter is sensitive to eluting species that increase or decrease fluid electrical conductivity. Most acids ionize and cause a significant increase in fluid conductivity. In contrast, the nonionic sugar species in an aqueous solution cause only a small decrease in fluid electrical conductivity.

Thus, the special feature of this detector combination is that, at any given time, either of the eluting species (acid or sugar) can significantly influence only one of the two detectors. As the acid leaves the column, eluent optical rotation remains constant and as the sugar leaves the column eluent fluid conductivity remains constant. The detectors were calibrated at 26° C. and the curves plotted as conductivity (for acid) and optical rotation (for sugar) versus concentration (in percent by weight), were linear.

The glass and PVC columns measured 1200 mm in length and 50 mm in inner diameter. Each glass column had closure fittings at both ends made of polytetrafluoroethylene. A fritted glass plate was seated above all bottom fittings to retain the resin while permitting fluid flow out of the column. The columns were packed with the resin as a slurry in deionized water. This technique ensured that the resin was placed into the column in its swollen form. Since a fluid feed mixtures containing acid results in acid-resin, interactions that cause shrinkage of the resin matrix prior to introducing hydrolyzate to the resin bed, the hydrolyzate was conveyed through the floating head distribution device comprising one principal embodiment of the instant invention. The specific gravity of the floating head distribution device ensured a minimization or elimination of dead volume above the resin. The minimization or elimination of the dead volume above the resin permitted complete separation of the sulfuric acid and sugar contained in the hydrolyzate at acid concentrations, feed volumes, and flux rates well in excess of those possible with conventional ion exclusion systems.

Columns were packed with different commercially available resins to test each resin for acid/sugar separation performance. The resins examined were the strongly acidic, cation-exchange sulfonated polystyrene type differing in their percent divinylbenzene (DVB) cross-linkages. The commercial grade resins used were Rohm and Haas Gel type Amberlite IR 120 H+ (8.0% DVB, 25–50 mesh), IR 118 H+ (4.5% DVB, 25–50 mesh) and Dow Chemical Company type DOWEX50 H+ (2.0% DVB, 50–100 mesh). The DOWEX resin was washed with a 7 percent to 10 percent hydrochloric acid aqueous solution to convert the resin from the sodium to the hydrogen form. The prepared resin was then packed into the columns. The procedures used to pack the resins were those supplied by the manufactures. Columns were repacked only to test the effectiveness of the various resins. It was not necessary to repack the columns between runs with the same resin. The procedures described, infra, were used during operation of the preparative-scale system.

EXAMPLE I

The procedures, materials, and facilities described above were used to effect the tests for this example. Accordingly, sugar solute elution chromatograms were generated from studies on a single column packed with IR 118 H+ (4.5% DVB) resin. A feed volume of 1.0 percent of total column volume (23 ml) was injected at a fluid flux rate of 0.66 cm/min. The fluid flux rate is defined as the volumetric fluid flow rate, Q, divided by the column cross-sectional area, S. This fluid flux rate corresponds to a volumetric flow rate of 13.0 ml/min. The glucose feed concentration was varied from 4.0 percent to 12.0 percent by weight. Several chromatograms of $\psi$, dimensionless concentration, versus $\tau$, dimensionless time, at different feed concentrations are shown in FIGS. 6A–6E, i.e., 4, 6, 8, 10, and 12 percent sugar in 601, 611, 621, 631, and 641, respectively. The total fluid volume fraction within the resin packed column, $\alpha+\beta$, was 0.824. As shown, the concentration of sugar in the feed has no effect on the sugar elution times or the chromatogram shape in dimensionless space. The value of $\psi_{sugar\text{-}max}$ and the peak widths are the same for all feed concentrations. This behavior indicates that the feed concentration of sugar (without the presence of acid) has minimum effect on column performance.

Acid/sugar chromatograms for fluids containing different acid concentrations (ranging from 2.0 to 12.0 percent by weight) and the same sugar concentration (8.0 percent by weight) were generated. A feed volume of 46 ml (2 percent of the column volume) a fluid flux rate of 0.66 cm/min and a 114.5 cm long by 5.0 cm diameter column packed with IR 118 H+ resin was used. FIGS. 7A–7E show the effect of acid feed concentration, i.e., 2, 4, 6, 8, and 12 percent acid in 701, 711, 721, 731, and 741, respectively, on the $\psi_{acid\text{-}max}$ and peak widths on both the acid and sugar elution profiles. The profiles show that ion exclusion separation efficiency improves with lower acid feed concentrations. This is evidenced by the fact that $\psi_{acid\text{-}max}$ decreases, while the peak width increases as feed acid concentration increases. The column species separation efficiency decreases as a direct result of high acid feed concentrations. Increasing the acid feed concentration from 2.0 to 12.0 percent causes a progressive decrease in $\psi_{acid\text{-}max}$ and a progressive increase in acid elution peak width. The sugar elution profiles shift left and broaden as the acid feed concentration increases. Thus, the sugar profiles have more dispersion as the acid concentration in the feed increases.

EXAMPLE II

As in Example I, supra, the procedures, materials, and facilities described thereabove were used to effect the tests for this example. In addition, and more specifically, acid/sugar elution chromatograms for a model fluid containing 6.0 percent acid and 8.0 percent glucose (hereafter referred to as the standard feed fluid) was eluted through a single column packed with IR 118 H+ resin using a feed volume of 2.0 percent (46 ml). The results of these tests can most conveniently be best understood and further appreciated by referring again to FIGS. 8A–8E which show the effect of the fluid flux rate through a column on species separation performance.

The $\psi_{acid\text{-}max}$ and the $\psi_{sugar\text{-}max}$ remain unchanged even at a flux of 0.852 cm/min (812 and 813, respectively) which is about 50 percent higher than the lowest flux rate of 0.585 cm/min (802 and 803, respectively). However, increasing flux to 1.257 cm/min caused noticeable dispersion of the sugar elution profile (833). The maximum dimensionless concentration of the sugar, $\psi_{sugar-max}$ decreased and the profile width broadened at this high flux rate. Sugar mass transfer between macropore volume and micropore volume is diffusion controlled. At higher flux rates, time for mass transfer of sugar into the resin is limited. Thus, there is a tendency for sugar elution chromatogram broadening at higher flux rates. In contrast, the acid species elution time was unchanged by flux rate because it is primarily excluded from the micropore volume of the resin and thus time for mass transfer is not needed.

At flux rates higher than about 1.00 cm/min species separation performance diminishes. At fluid flux rates lower than about 1.00 cm/min throughput of hydrolyzate would decrease and diminish the instant invention's effectiveness.

EXAMPLE III

As in Example I, supra, the procedures, materials, and facilities described thereabove were used to effect the tests for this example. The results of these tests can most conveniently be best understood and further appreciated by referring again to FIGS. 9A–9E which show the effect of feed volume on the acid and sugar elution profiles. Acid/sugar elution chromatograms were generated using the standard feed fluid for a feed volume ranging from 1.0 to 5.0 percent of the empty column volume. The standard feed fluid was injected at a flux rate of 0.66 cm/min through a single column packed with IR 118 H+ resin.

For feed volumes ranging from 1.0 to 5.0 percent, i.e., 903 for 1 percent, 913 for 2 percent, 923 for 3 percent, 933 for 4 percent, and 943 for 5 percent, the $\psi_{sugar-max}$ and sugar profile width increases proportionately with feed volume injected. The $\psi_{acid-max}$ increased with increasing feed volume, but at a rate larger than the sugar species. Acid elution profile widths also broadened to decrease species separation performance and increase cross-over contamination between species. The shape of the acid profiles remained almost unchanged as the feed acid concentration was increased.

Increasing the feed volume while maintaining the resin column length constant will result in higher throughput rates but will also lower species separation performance. The enhanced throughput associated with an increase in feed injection volume is at the expense of a lower species separation performance. However, as will be shown by Example V, infra, separation performance can be improved at higher feed injection volumes by increasing column length.

EXAMPLE IV

As in Example I, supra, the procedures, materials, and facilities described thereabove were used to effect the tests for this example. Acid/sugar elution chromatograms were generated using the standard feed fluid, supra, for a series of three resins varying in their percent DVB cross-link density. The resins compared were DOWEX50W (2.0 percent DVB) manufactured by Dow Chemical Company and IR 118 H+ (4.5 percent DVB) and IR 120H+ (8.0 percent DVB) manufactured by Rohm and Haas. All the resins were obtained in or converted to their hydrogen form. The standard feed fluid was always injected at a flux rate of 0.66 cm/min and at a feed volume of 2.0 percent. The results of these tests can most conveniently be best understood and further appreciated by referring again to FIGS. 10A–10C which show the plot of $\psi_{species}$ versus elution volume in milliliters for both species using the three resins.

Referring again to FIGS. 10A–10C, the resin with the highest percent DVB, IR 120 H+, as depicted in chromatogram 1001, showed almost no separation between species, as can be seen from the elution profiles of both acid (1002) and sugar species (1003) appearing over almost the same elution volume. This resin is a poor candidate for the separation of acid from sugars. The IR 118 H+ resin, as shown in chromatogram 1011, with less cross-linking (4.5 percent DVB) showed satisfactory separation between the acid (1012) and sugar species (1013). The difference in separating ability of these two resins can be explained on the basis of their pore structure. The higher the resin cross-link density, the lower the resin micropore volume available for sugar to penetrate. Lowering the polymer cross-linking density produces a resin matrix with increased micropore volume accessible for sugar penetration. Larger micropore volume per unit volume of packed column increases retention of the sugar species. However, the acid elutes over almost the same elution volume for both resins because its retention is only affected by the macropore volume between resin particles which is almost the same for all packed beds with the same particle size regardless of resin type. Thus, the macropore volume of these two resin beds having the same resin particle size are about equal.

Using a DOWEX50W resin with a much lower cross-link density (2.0 percent DVB) results in total separation of acid from the sugar species. It is obvious from chromatogram 1021, that there is a lapse of volume ($\Delta\tau AS > 0$) between the two species eluting from the 2 percent DVB resin column. This resin could process fluids at a higher flux rate or greater feed volume and still maintain species separation. Additionally, the sugar profile (1023) is less dispersed than experienced in other resins. The higher resolution of this profile indicates that the DOWEX50W resin, which has a smaller cross-linking relative to the other resin grades, has more separation capability per unit length of packed column. In addition, the smaller DOWEX50W resin particle size has improved performance by increasing the total interface area over which sugar mass transfer into the resin occurs. However, the lower cross-link density of the DOWEX50W also causes the resin to swell and shrink to a greater extent than the other two resin types. A high degree of resin shrinking and swelling may eventually cause long-term damage to the resin physical structure.

EXAMPLE V

As in Example I, supra, the procedures, materials, and facilities described thereabove were used to effect the tests for this example. Acid and sugar elution chromatograms were generated for several feed fluids by varying feed volumes and column lengths. The IR 118 H+ resin was used to study the effect of column length on acid/sugar separation performance. The results of these tests can most conveniently be best understood and further appreciated by referring again to FIGS. 11A–11D which show the effects of increasing the column length by a factor of two for the standard feed fluid at feed volumes of 2.0 and 10 percent injected and at a flux rate of 0.66 cm/min. Comparing chromatograms

1101 and 1111, the $\psi_{sugar-max}$ increases by 35.0 percent while that of the $\psi_{acid-max}$ increases only 10.0 percent as the length increases. As expected, the separation performance improves as evidenced by $\Delta\tau AS$ increasing from −0.03 (overlap of species in 1101) to +0.04 (complete separation of species in 1111).

Process economics improve when the time lapse between the acid and sugar elution times is zero ($\Delta\tau AS$ equal zero) because at this condition, optimum column utilization has been achieved. Thus, the injection feed volume can be adjusted to make the best utilization of any given column length or resin type.

Comparing chromatograms 1121 and 1131 to 1101 and 1111 shows that increasing the feed volume from 2 percent feed volume in 1101 to 10 percent feed volume in 1121, while keeping the column length constant increased throughput, but at the expense of lowering species separation performance. However, increasing the column length by a factor of two in 1131, at 10 percent feed volume, increased the $\psi_{sugar-max}$ by almost 33 percent while the $\psi_{acid-max}$ remained almost constant. Ideally, best process performance occurs when sharp and narrow profiles elute. This condition gives the highest concentration of species in the eluting stream. Minimization of skewness for both profiles improves species separation, maximizes concentration, and thus increases throughput.

The column length studies show that longer resin beds give higher hydrolyzate feed throughputs while simultaneously increasing species separation performance and thus producing higher utilization of the instant invention.

EXAMPLE VI

Real fluid hydrolyzates were filtered to give a pristine yellow solution. The hydrolyzates investigated were obtained from the hydrolysis of the following cellulose sources: 1) cotton linters to yield a hydrolyzate containing 10 percent acid, 5 percent total sugars, 2) rice straw to yield a hydrolyzate containing 8 percent acid, 2 percent total sugars, 3) type-I municipal solid waste (MSW) to yield a hydrolyzate containing 7 percent acid, 7 percent total sugars, and 4) type-II MSW to yield a hydrolyzate containing 11 percent acid, 3 percent total sugars.

Table 1 below provides chromatogram characteristics for a 2.0 percent feed volume of each of these hydrolyzates eluted through a single column packed with IR 118 H+ resin operating at a fluid flux rate of 0.66 cm/min. These elution data are compared with the standard feed fluid that contained 6.0 percent acid and 8.0 percent sugar. Data are given showing the start point, $\tau_{start}$, and end point, $\tau_{end}$, of each species elution profile for a given hydrolyzate feed. The maximum profile concentration experienced, $\psi_{max}$, and the time for this maximum, $\tau_{max}$, are also provided. The data show that the average elution times of the acid and total sugars match those of the standard feed fluid. However, there were some sugar profile differences between feed fluids which are due to sugar composition variations with real hydrolyzates. Several different sugars exist in the real hydrolyzates, i.e., glucose, xylose, mannose, arabinose. Thus, for the real hydrolyzates, a distribution of sugar species eluted over a larger volume range than the single glucose sugar of the standard feed fluid.

TABLE 1

| | Chromatogram Characteristics | | | | | |
|---|---|---|---|---|---|---|
| Hydrolyzate Type | Hydrolyzate Species | Feed Concentration | $\tau_{start}$ | $\tau_{end}$ | $\psi_{max}$ | $\tau_{max}$ |
| Cotton Linters | Acid | 10 | 0.42 | 0.58 | 0.26 | 0.51 |
| | Sugar | 5 | 0.50 | 0.94 | 0.13 | 0.69 |
| Rice Straw | Acid | 8 | 0.42 | 0.59 | 0.30 | 0.54 |
| | Sugar | 2 | 0.45 | 1.00 | 0.10 | 0.78 |
| Type I MSW | Acid | 7 | 0.40 | 0.59 | 0.30 | 0.54 |
| | Sugar | 7 | 0.40 | 1.00 | 0.11 | 0.73 |
| Type II MSW | Acid | 11 | 0.40 | 0.59 | 0.28 | 0.54 |
| | Sugar | 3 | 0.56 | 1.00 | 0.11 | 0.73 |
| Model Fluid | Acid | 6 | 0.45 | 0.58 | 0.29 | 0.53 |
| | Sugar | 8 | 0.57 | 1.05 | 0.12 | 0.74 |

INVENTION PARAMETERS

After sifting and winnowing through the data supra, as well as other results and operations of our new, novel, and improved technique, including methods and means for the effecting thereof, the operating variables, including the acceptable and preferred conditions for carrying out our invention are summarized below:

| Variables | Operating Limits | Preferred Limits | Most Preferred Limits |
|---|---|---|---|
| Acid Concentration (% $H_2SO_4$) | 1.0–20.0 | 3.0–10.0 | 5.0–8.0 |
| Feed Volume (% of empty column volume) | 1.0–5.0 | 2.0–4.0 | 2.0–3.5 |
| Flux rate (cm/min) | 0.1–2.0 | 0.4–1.2 | 0.50–1.0 |
| Resin (% DVB cross-linking) | 1.0–15.0 | 2.0–12.0 | 2.0–8.0 |

These parameters represent the principal parameters that must be kept in mind in predetermining or otherwise arriving at acceptable operation of those aspects of the instant invention pertaining to column chromatography. A less obvious but equally important parameter is column length. As described supra, acceptable column operation at higher feed volumes is possible with longer columns. In designing a system, it is of utmost importance to mathematically predict that column length required for the application being considered. Failure to determine the proper column length may result in a mixing of the elution streams. The use of the instant invention allows designers to accurately predict, by means of readily available theoretical correlations, the operating characteristics of any ion exclusion column chromatography systems by otherwise avoiding consideration of the less quantifiable phenomena caused by the presence of a dilution layer above the resin bed.

While we have shown and described particular embodiments of our invention, modifications and variations thereof will occur to those skilled in the art. We wish it to be understood therefore that the appended claims are intended to cover such modifications and variations which are within the true scope and spirit of our invention.

What we claim as new and desire to secure by Letters Patent of the United States is:

1. In an improved process for effecting separation of components in a solution comprising an ionic component and a nonionic component, the concentration of said ionic component ranging from about 1 weight percent to about 20 weight percent, and the concentration of said nonionic component ranging from about 1 weight percent to about 25 weight percent, said improved process comprising the steps of:

(1) introducing a stream of said solution into the upper portion of a vessel containing a bed of ion exchange resin, said vessel having an open end at said upper portion thereof, said resin being in its hydrogen form to thereby effect its ion exclusion state and washed in aqueous media to thereby effect its swollen state and said bed being initially inundated in aqueous media;

(2) introducing a stream of aqueous media into the upper portion of said vessel;

(3) removing from said vessel and introducing into means for disposal a stream of fluid juxtaposed the bottommost portion of said vessel at a flow rate substantially equal to the rate of flow of stream introduction in step (1) supra, to thereby effect moving said solution through a vertical length of said bed, said vertical length and said flow rate predetermined to be sufficient to thereby effect a change in the concentration of said components relative one to another, wherein results, in fluid juxtaposed the bottommost portion of said vessel, an enriched fraction of said ionic component;

(4) removing from said vessel a stream of fluid juxtaposed the bottommost portion of said vessel to first means for collection of said resulting enriched fraction of said ionic component until said withdrawn fluid is substantially depleted of said ionic component; and (5) removing from said vessel a stream of fluid juxtaposed the bottommost portion of said vessel to second means for collection of a resulting enriched fraction of said nonionic component;

said improved process, for substantially eliminating the deleterious effects normally attributed to the phenomenon known as dispersion and generally attributed to shrinkage of such resin, comprising the additional steps of:

(a) contacting the top of said bed with a physical barrier having a peripheral configuration complementary to the cross-sectional dimensions of said vessel and adapted to be placed within said open end of said vessel and further adapted for slidable engagement therewith;

(b) introducing said solution through said physical barrier onto the top of said bed; and (c) maintaining juxtaposition of said physical barrier with the top of said bed by means of said slidable engagement to thereby prevent the establishment over said bed of any substantial zone of said solution.

2. The process of claim 1, wherein the specific gravity of said physical barrier, in relation to said solution, is sufficient to maintain said juxtaposition thereof with the top of said bed.

3. The process of claim 2, wherein said specific gravity of said physical barrier ranges from about 1.2:1 to about 10:1.

4. The process of claim 1, wherein $\tau_{start}$ for said nonionic component is substantially equal to $\tau_{end}$ for said ionic component, whereby there is substantially eliminated resulting cross-over contamination of the ionic eluting component by the nonionic eluting component.

5. The process of claim 1, wherein $\tau_{start}$ for said nonionic component is less than $\tau_{end}$ for said ionic component and wherein is removed from said vessel a stream of fluid juxtaposed the bottommost portion of said vessel to a second disposal means prior to removing said stream to said second means for collection, said stream of fluid introduced into said second disposal means comprising a fraction of said ionic component resulting from said substantial depletion thereof and a fraction of said nonionic component resulting from said enrichment thereof, whereby is substantially eliminated the deleterious effects normally attributed to the resulting cross-over contamination of the ionic eluting component by the nonionic eluting component.

6. The process of claim 1, wherein $\tau_{start}$ for said nonionic component is greater than $\tau_{end}$ for said ionic component and wherein is removed from said vessel a stream of fluid juxtaposed the bottommost portion of said vessel to a second disposal means prior to removing said stream to said second means for collection, said stream of fluid introduced into said second disposal means comprising aqueous media resulting from elution thereof after said ionic component elution and prior to elution of said nonionic component, whereby is substantially eliminated the deleterious effects normally attributed to the time lapse resulting after said ionic component elution has been effected and prior to commencement of said nonionic component elution.

7. The process of claim 1, wherein the slidable engagement between said physical barrier and the open end of said vessel is effected by physical drive means.

8. The process of claim 7, wherein activation of said drive means is effected pneumatically.

9. The process of claim 7, wherein activation of said drive means is effected by dimensional change in a resilient material.

* * * * *